United States Patent
Takagi

(10) Patent No.: US 8,397,179 B2
(45) Date of Patent: Mar. 12, 2013

(54) DISPLAY CONTROL APPARATUS AND DISPLAY CONTROL METHOD

(75) Inventor: Yousuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/688,016

(22) Filed: Jan. 15, 2010

(65) Prior Publication Data

US 2010/0192099 A1      Jul. 29, 2010

(30) Foreign Application Priority Data

Jan. 28, 2009   (JP) .................................. 2009-017129

(51) Int. Cl.
*G06F 3/048* (2006.01)
(52) U.S. Cl. ......... 715/828; 715/821; 715/813; 715/866
(58) Field of Classification Search .................. 715/828, 715/821, 813, 866; 345/173
See application file for complete search history.

(56) References Cited

U.S. PATENT DOCUMENTS

| 6,674,472 B1 * | 1/2004 | Tsutsui ..................... 348/333.05 |
| 7,065,710 B2 * | 6/2006 | Hayashi et al. ............... 715/732 |

FOREIGN PATENT DOCUMENTS

JP          3-214981          9/1991

* cited by examiner

*Primary Examiner* — Tadeese Hailu
*Assistant Examiner* — Darrin Hope
(74) *Attorney, Agent, or Firm* — Fitzpatrick, Cella, Harper & Scinto

(57) ABSTRACT

A display control apparatus that makes it easy to recognize a target image when images are displayed in each of regions obtained by dividing a single screen, even when the method for dividing the screen has changed. For example, when the method for dividing the screen in an index view is switched, the post-switch location of a target thumbnail image is calculated based on the ratio between the pre- and post-switch division numbers and the pre-switch location of the target thumbnail image, in both the horizontal and vertical directions. Then, the overall arrangement of the thumbnail images in the index view after the division method switch is determined based on the calculated location of the target thumbnail image.

31 Claims, 13 Drawing Sheets

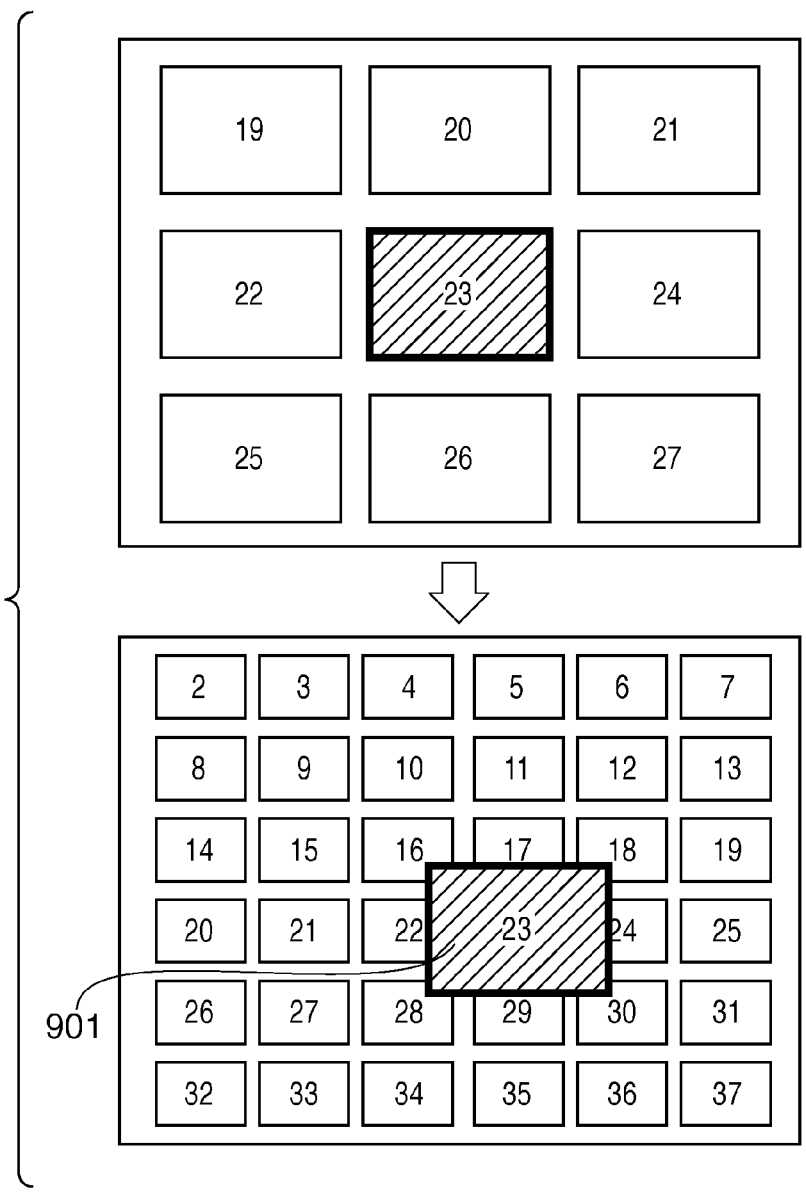
F I G. 9

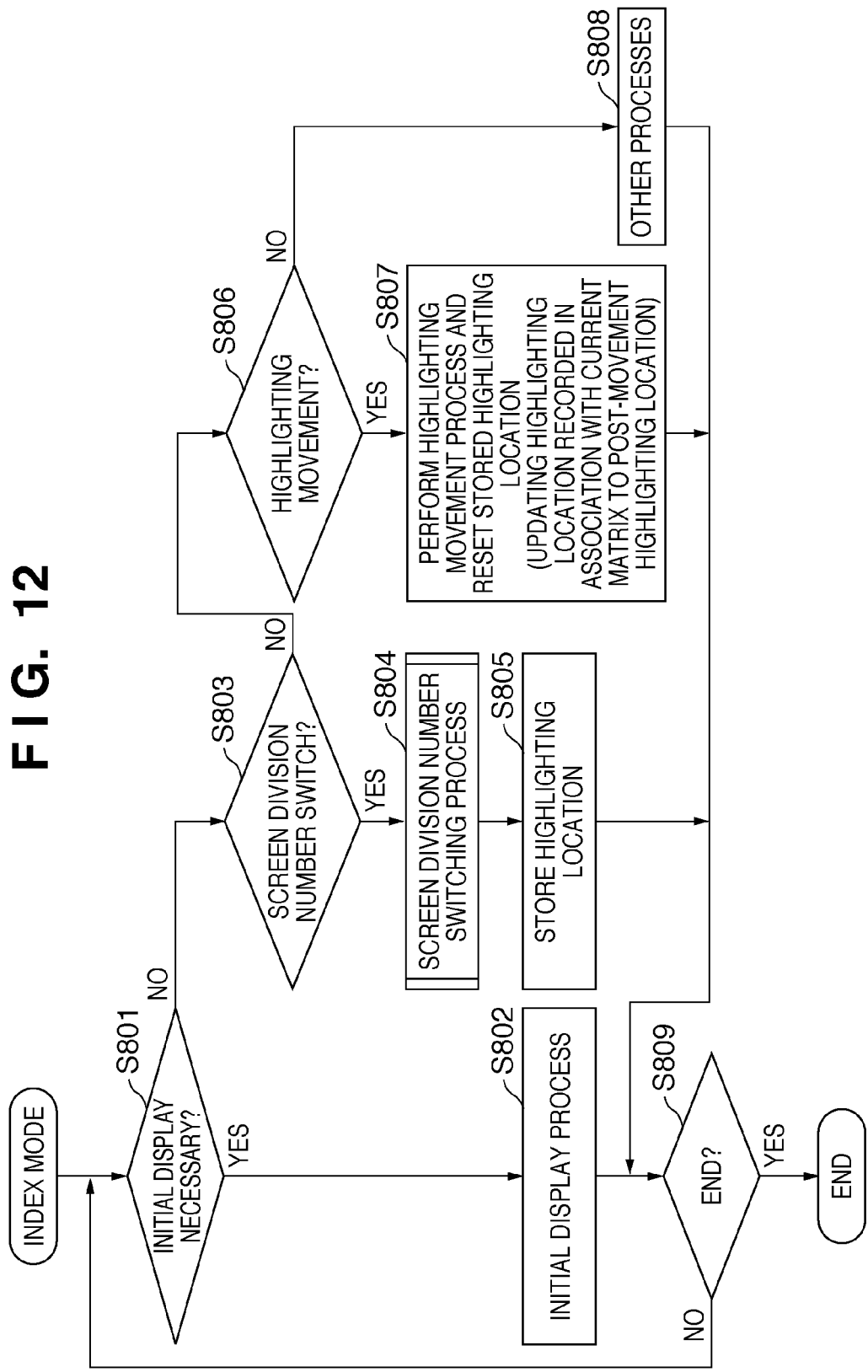

DISPLAY CONTROL APPARATUS AND DISPLAY CONTROL METHOD

BACKGROUND OF THE INVENTION

1. Field of the Invention

The present invention relates to a display control apparatus and display control method for controlling the display of an image, and particularly relates to a display control apparatus and display control method that display images in each of regions obtained by dividing a single screen into matrix form.

2. Description of the Related Art

The capacities of storage media have been increasing in recent years, and storing a large number of images has become possible even in small electronic devices such as digital cameras. For this reason, an index view function, which displays a collection of multiple thumbnail images in a single screen, can be considered a technique useful for improving the searchability, viewability, and so on of images stored in the storage medium (for example, see Japanese Patent Laid-Open No. 3-214981). For example, selecting, through user operations, a desired image from the displayed collection of thumbnail images results in the image corresponding to the specified thumbnail image being read out from the storage medium and displayed in the screen.

While increasing the number of thumbnail images displayed in a single screen during this index view improves the searchability, doing so also reduces the resolution of the thumbnail images. Conversely, while reducing the number of thumbnail images displayed in a single screen improves the resolution of the thumbnail images, doing so also impairs the searchability. Enabling switching between the numbers of thumbnail images displayed can therefore address the demands of both of these situations.

Incidentally, during an index view, the selected thumbnail image, or in other words, the thumbnail image to be focused on, is generally highlighted. This highlighting is performed by emphasizing the selected thumbnail by displaying, for example, a selection frame or the like. Performing such highlighting makes it easy to identify the selected thumbnail image.

Conventionally, the position of the highlighting on the screen has sometimes moved when switching the number of thumbnail images to be displayed in an index view. This occurs because the location of the highlighted thumbnail image is based upon what number image that thumbnail image is within the images displayed on the screen. This phenomenon occurs in the case where, for example, when switching the number of displayed thumbnail images, the image in the upper left corner of the screen is fixed and the thumbnail images are arranged using the image in the upper left corner as the origin.

Such movement of highlighting occurring when switching the number of displayed thumbnail images in an index view shall be described in detail using FIG. 1. FIG. 1 illustrates an example of such highlighting movement in the case of transiting between index views in which the number of thumbnail images displayed in the screen differs while retaining the thumbnail image selection. Note that in FIG. 1, each square represents a thumbnail image, and it is assumed that the image corresponding to the thumbnail image that is stored in the storage medium is read out from the storage medium and displayed according to the order of the numbers within each square. In the case where this index view is applied in a digital camera, this order is based upon, for example, the shooting date/time of the image.

The upper, middle, and lower sections of FIG. 1 illustrate examples in which a single screen in index view is divided into two rows by two columns, three rows by three columns, and six rows by six columns, respectively. The thumbnail images in each index view are arranged in order based on the numbers within each of the squares. In addition, in FIG. 1, the highlighting is expressed as diagonal hatching within a square.

Consider, as an example, a case where the thumbnail image in the upper left corner of the screen is taken as the origin, and the thumbnail images are sequentially arranged in numerical order moving to the right of the origin, continuing onto a new row therebelow while maintaining the numerical order. Such an arrangement is generally used as the method for arranging images on the screen. The image used as the origin in the upper left corner is fixed before and after the number of thumbnail images has been switched, or in other words, before and after the screen division method has been switched.

In the two-row-by-two-column arrangement illustrated in the upper section of FIG. 1, the thumbnail image with the number "5", located in the lower right corner of the screen, is highlighted. When this arrangement is transited to the three-row-by-three-column arrangement illustrated in the middle section of FIG. 1, the thumbnail image with the number "5" moves to the center-left of the screen. Furthermore, when the arrangement is transited to the six-row-by-six-column arrangement illustrated in the lower section of FIG. 1, that thumbnail image moves to the vicinity of the center in the top of the screen.

In other words, in the example in FIG. 1, each time the number of displayed thumbnail images is switched in the index view, the location of the highlighting jumps from one end of the screen to the other, starting at the lower-right corner of the screen, moving to the center-left of the screen, and then moving to the vicinity of the center in the top of the screen. A user may thus lose sight of the highlighting if the location of that highlighting in the screen jumps when the number of displayed thumbnail images is switched during the index view. Thus, the conventional index view display method has a problem in that switching the number of thumbnail images displayed may impede the smooth viewing of the thumbnail images.

SUMMARY OF THE INVENTION

Accordingly, it is a feature of the present invention to provide a display control apparatus and display control method that enable the easy recognition of a target image when images are displayed in each of regions obtained by dividing a single screen, even when the method for dividing the screen has changed.

According to a first aspect of the present invention, there is provided a display control apparatus comprising:

a display control unit that performs control so that multiple images arranged in a matrix made up of multiple columns and multiple rows are displayed in a display unit;

a changing unit that changes the matrix for arranging the multiple images displayed by the display control unit from a first matrix to a second matrix in which the number of columns, rows, or both columns and rows is different from the first matrix; and a control unit that, when a change is performed by the changing unit, takes a location in the second matrix corresponding to the column and row in which a selected image in the first matrix is located as a reference location, and controls the display control unit to arrange the multiple images in the second matrix so that the selected image is located in the reference location.

According to a second aspect of the present invention, there is provided a display control method comprising:

a display control step of performing control so that multiple images arranged in a matrix made up of multiple columns and multiple rows are displayed in a display unit;

a changing step of changing the matrix for arranging the multiple images displayed by the display control step from a first matrix to a second matrix in which the number of columns, rows, or both columns and rows is different from the first matrix; and a control step of, when a change is performed by the changing step, taking a location in the second matrix corresponding to the column and row in which a selected image in the first matrix is located as a reference location, and controlling the display control step to arrange the multiple images in the second matrix so that the selected image is located in the reference location.

According to a third aspect of the present invention, there is provided a computer-readable storage medium embodying a computer program therein that causes a computer to execute a display control method comprising:

a display control step of performing control so that multiple images arranged in a matrix made up of multiple columns and multiple rows are displayed in a display unit;

a changing step of changing the matrix for arranging the multiple images displayed by the display control step from a first matrix to a second matrix in which the number of columns, rows, or both columns and rows is different from the first matrix; and a control step of, when a change is performed by the changing step, taking a location in the second matrix corresponding to the column and row in which a selected image in the first matrix is located as a reference location, and controlling the display control step to arrange the multiple images in the second matrix so that the selected image is located in the reference location.

According to the present invention, it is easy to recognize a target image when images are displayed in each of regions obtained by dividing a single screen, even when the method for dividing the screen has changed.

Further features of the present invention will become apparent from the following description of exemplary embodiments with reference to the attached drawings.

BRIEF DESCRIPTION OF THE DRAWINGS

FIG. 9 is a diagram illustrating an enlarged display of a target thumbnail image.

FIG. 12 is a flowchart illustrating an outline of an exemplary process performed during an index mode according to the second embodiment of the present invention.

DESCRIPTION OF THE EMBODIMENTS

Figure 1:
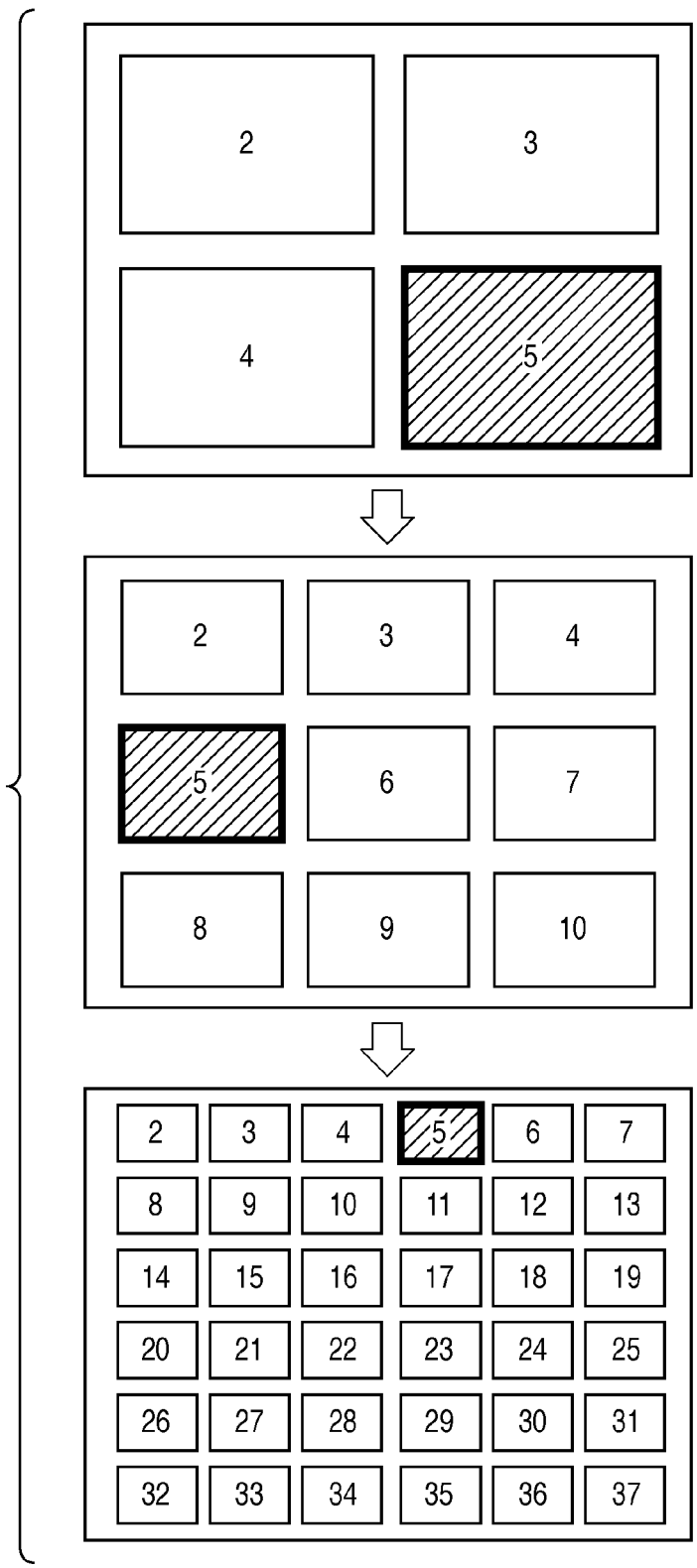
FIG. 1 is a diagram illustrating the movement of highlighting occurring when switching the number of displayed thumbnail images in an index view.
Figure 2:
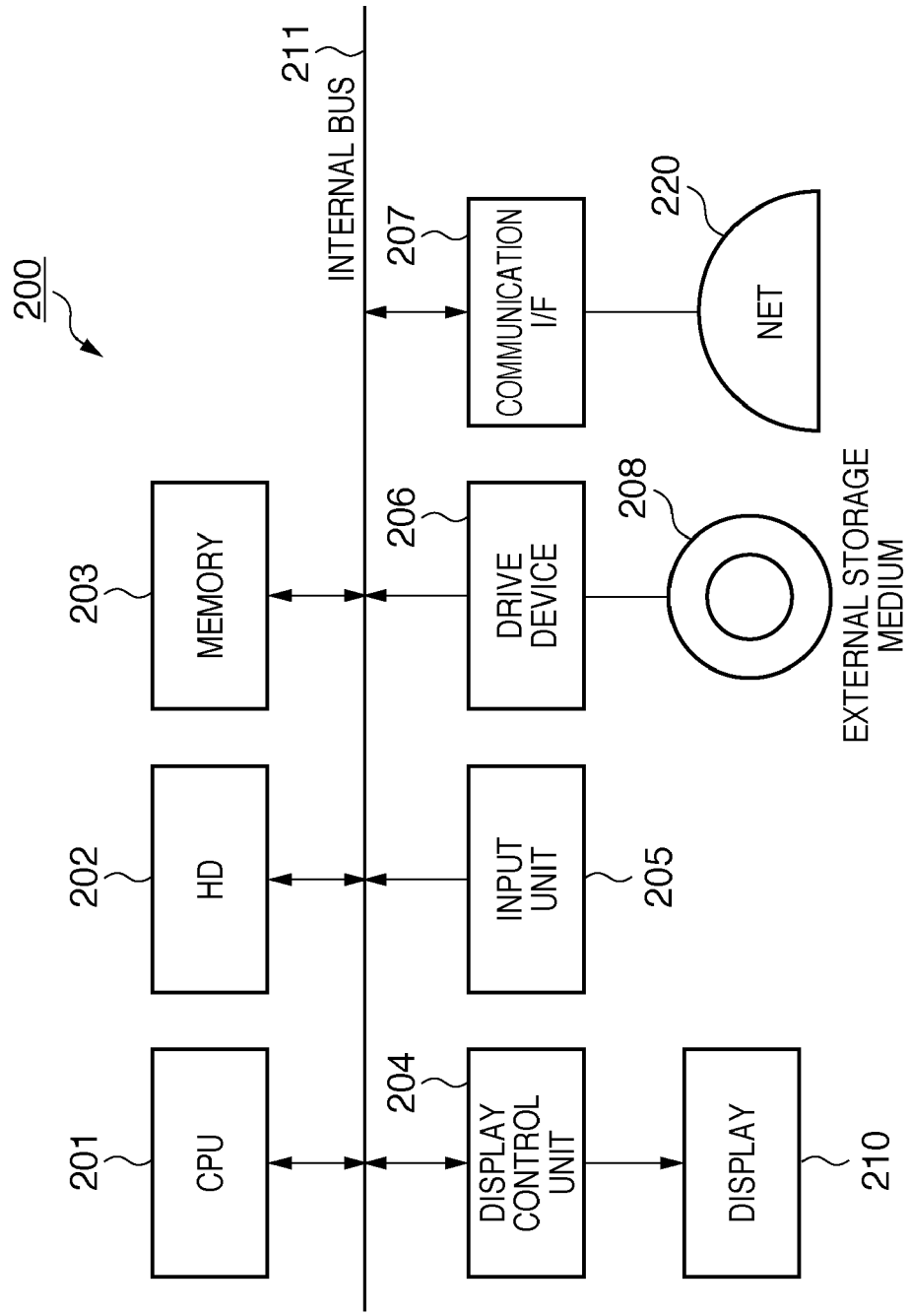
FIG. 2 is a block diagram illustrating an exemplary configuration of a display control apparatus in which embodiments of the present invention can be applied.

Embodiments of the present invention shall be described hereinafter with reference to the drawings. FIG. 2 illustrates an exemplary configuration of a display control apparatus 200 in which embodiments of the present invention can be applied. As shown in FIG. 2, the display control apparatus 200 can be configured using a typical personal computer.

In FIG. 2, a CPU 201, a hard disk (HD) 202, a memory 203, a display control unit 204, an input unit 205, a drive device 206, and a communication I/F 207 are connected to an internal bus 211. The various elements connected to the internal bus 211 are capable of exchanging data with one another via the internal bus 211.

The hard disk 202 stores image data and other data, various programs used by the CPU 201 to operate, and so on. The memory 203 is configured of, for example, a RAM. The CPU 201, serving as a display control unit, a changing unit, and a calculation unit, uses the memory 203 as a work memory, and controls the various elements of the display control apparatus 200 in accordance with, for example, a program stored in the hard disk 202. Note that the programs used by the CPU 201 to operate are not limited to those stored in the hard disk 202, and may, for example, be stored in a ROM (not shown) in advance.

The input unit 205 accepts user operations, generates control signals based on those operations, and supplies the control signals to the CPU 201. For example, the input unit 205 includes, as input devices for accepting user operations, a text information input device such as a keyboard, a pointing device such as a mouse or touch panel, and the like. Note that the "touch panel" mentioned here refers to an input device in which coordinate information is outputted based on locations on an input unit, configured as a flat surface, that have been touched. The CPU 201 controls the various elements of the display control apparatus 200 in accordance with programs, based on control signals generated and supplied by the input unit 205 in response to user operations made through the input device. Through this, a display control apparatus 200 can be caused to operate in accordance with user operations.

The display control unit 204 outputs a display signal for displaying an image in a display 210. For example, a display control signal generated by the CPU 201 in accordance with a program is supplied to the display control unit 204. The display control unit 204 generates a display signal based on this display control signal and outputs the display signal to the display 210. For example, the display control unit 204 causes a GUI screen that provides a GUI (Graphical User Interface) to be displayed in the display 210 based on the display control signal generated by the CPU 201. As one such GUI screen, an index view displaying a collection of thumbnail images is displayed in the display 210 based on control performed by the CPU 201 and the display control unit 204 (details shall be provided later).

Note that when a touch panel is used as the input unit 205, the input unit 205 and the display 210 can be configured as a single entity. For example, the touch panel is configured having a light transmissibility that does not interfere with the display of the display 210, and is attached upon the display surface of the display 210. The input coordinate system of the touch panel is then associated with the display coordinate system of the display 210. This makes it possible to configure a GUI that makes the user feel as if he or she is actually directly manipulating the screen displayed in the display 210.

The drive device 206 is capable of being loaded with an external storage medium 208, such as a CD or DVD, and reads out data from a loaded external storage medium 208 or writes data to the external storage medium 208 under the control of the CPU 201. Note that the external storage medium 208 that can be loaded into the drive device 206 is not limited to a disc-type recording medium such as a CD or DVD; the drive device 206 may be made able to load, for example, a non-volatile semiconductor memory. The communication interface (I/F) 207 communicates with a network 220, such as a LAN or the Internet, under the control of the CPU 201.

<First Embodiment>

Next, a first embodiment of the present invention shall be described. The display control apparatus 200 according to the present first embodiment has, as image display modes for displaying images in the display 210, a single mode that displays a single image using the entire screen, and an index mode that displays a collection of multiple thumbnail images. In the index mode, the thumbnail images are displayed in each of regions obtained by dividing a single screen into matrix form. The image display mode can be switched between the single mode and the index mode through operations made using the input unit 205.

The following describes a situation in which the image display mode is switched to the index mode from a state in which a predetermined image is displayed in the display 210 in the single mode.

Figure 3:
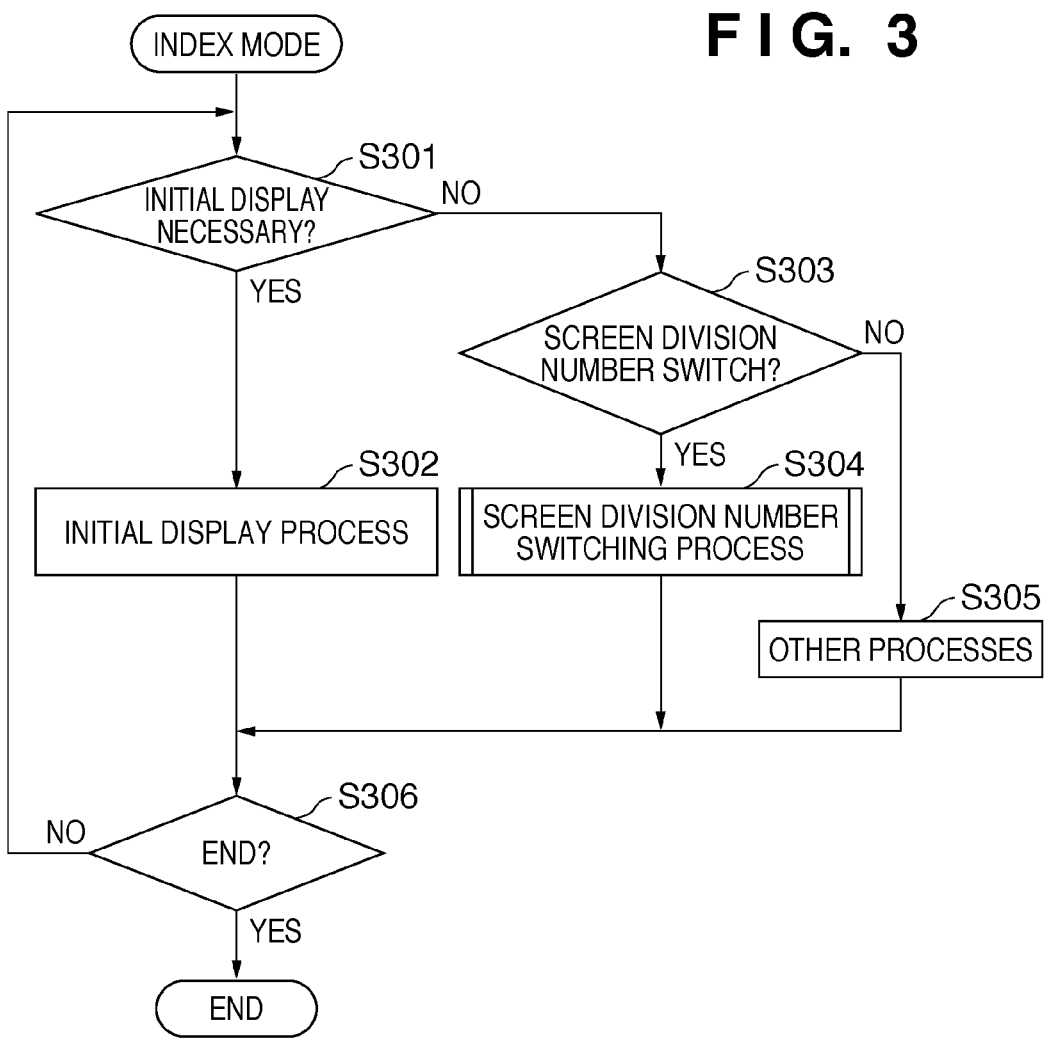
FIG. 3 is a flowchart illustrating an outline of an exemplary process performed during an index mode according to a first embodiment of the present invention.

FIG. 3 is a flowchart illustrating an outline of an exemplary process performed during the index mode according to the present first embodiment. Each process in the flowchart shown in FIG. 3 is realized by the CPU 201 expanding a program stored in the hard disk 202 or the like in the memory 203 and executing that program.

First, in step S301, it is determined whether or not an initial display is necessary in the index mode. If it has been determined that the initial display is necessary, the procedure moves to step S302. For example, if the image display mode has just been switched from the single mode to the index mode, it is determined that the initial display is necessary, and the process moves to step S302.

In step S302, a process for displaying the initial screen of the index mode in the display 210 is performed. For example, the CPU 201 reads out, from the hard disk 202, a storage medium loaded in the drive device 206, or the like, a number of images equivalent to the number of screen divisions in the index mode, using the image displayed in the single mode immediately prior to step S301 as a basis. Then, the CPU 201 generates, for each image read out from the storage medium, a thumbnail image of a size adapted to the number of screen divisions, and displays the generated thumbnail images in the display 210 arranged in a predetermined order, thereby composing an index view. When the initial screen display process has ended, the procedure moves to step S306, which shall be described later.

If, however, it has been determined in the aforementioned step S301 that the initial display is unnecessary, the procedure moves to step S303. In step S303, the apparatus stands by for a user operation made through the input unit 205, and when a user operation has been made, it is determined whether or not that user operation is an operation for requesting a screen division number switch in the index view.

If it has been determined that the user operation is an operation requesting a screen division number switch, the procedure moves to step S304, where, through a process that shall be described later, the number of screen divisions in the index view is switched. When the number of screen divisions has been switched, the procedure moves to step S306.

However, if it has been determined in step S303 that the user operation is not an operation requesting a screen division number switch, the procedure moves to step S305, where other processes, or processes aside from the screen division number switching process for the index view, are performed. These "other processes" are not particularly limited, but moving the highlighting, switching the display of information related to an image, displaying a menu, or the like can be thought of as processes related to the present first embodiment. When these other processes have ended, the procedure moves to step S306.

Note that "moving the highlighting" refers to, for example, a process for changing the highlighted thumbnail image based on the currently-selected thumbnail image being changed in response to user operations made through the input unit 205. This highlighting is realized by, for example, displaying a frame (called a "selection frame") around the thumbnail image. Moving the highlighting causes the selection frame indicating the current selection to move from the thumbnail image highlighted prior to the movement to a thumbnail image that is the destination of the highlighting movement, thereby changing the selected thumbnail image.

As described above, when the processes of step S302, S304, or S305 end, the procedure moves to step S306. In step S306, it is determined whether or not an end event causing the index mode to end has occurred. If it has been determined that an end event has not occurred, the procedure returns to step S301. However, if it has been determined that an end event has occurred, the series of index mode processes ends.

An end event occurs when, for example, an image display mode aside from the index mode has been selected through user operations, the operational mode of the display control apparatus 200 is switched to a mode aside from the image display mode, and so on. However, the occurrence of an end event is not limited thereto, and an end event also occurs when an operation to power off the apparatus has been accepted, when the display control apparatus 200 runs on batteries and it is detected that the battery power has been exhausted, and so on. Furthermore, an end event can be caused to occur when no user operations have been made through the input unit 205 for a predetermined amount of time.

Figure 4:
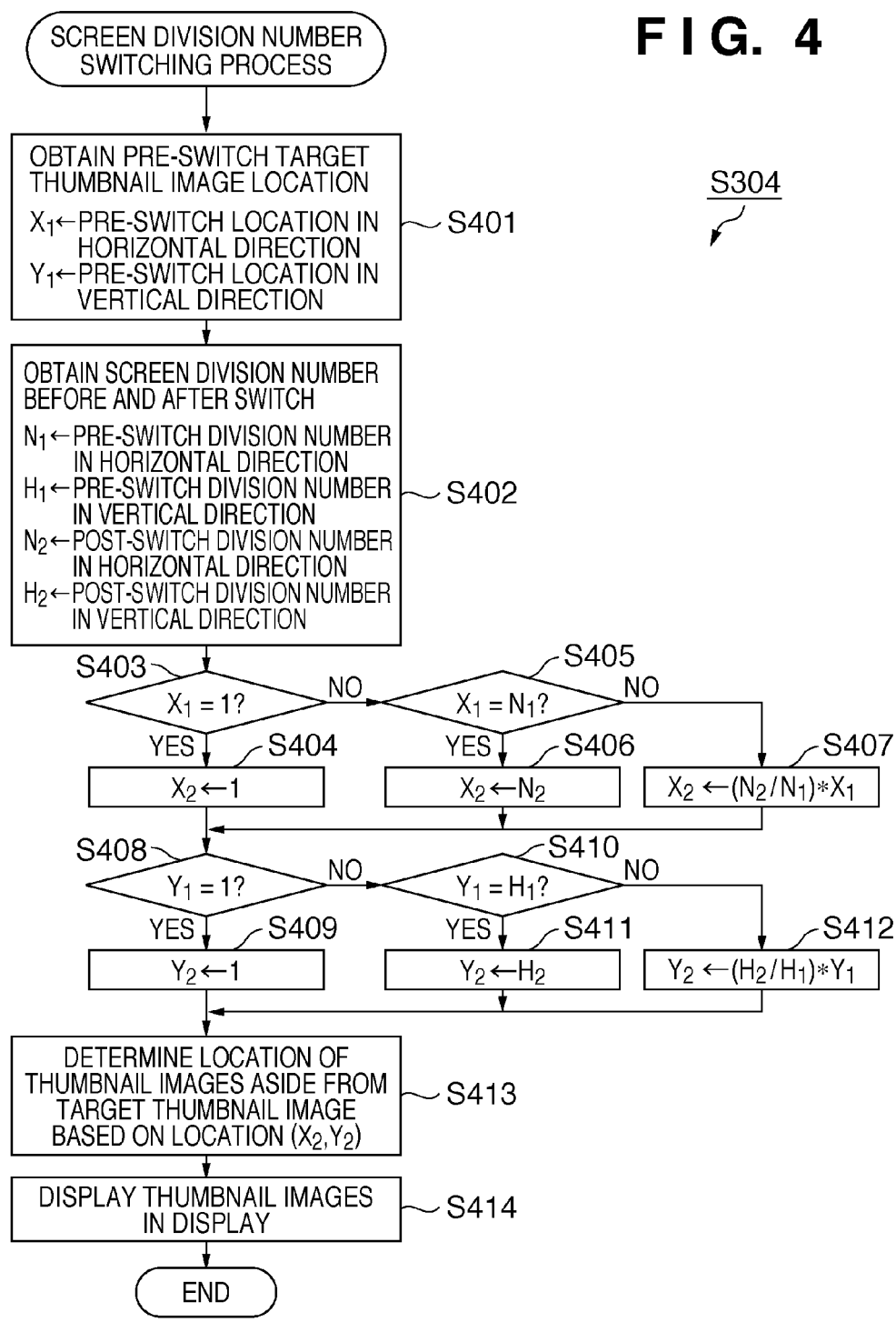
FIG. 4 is a flowchart illustrating an example of a screen division number switching process according to the first embodiment of the present invention.

Next, the screen division number switching process of step S304 in the aforementioned flowchart of FIG. 3 shall be described in further detail. FIG. 4 is a flowchart illustrating an example of a screen division number switching process according to the present first embodiment. The various processes in this screen division number switching process are realized by the CPU 201 expanding a program stored in the hard disk 202 or the like in the memory 203 and executing that program.

In the present first embodiment, when the screen division number is switched in the index view, the location of a thumbnail image in the post-division number switch screen corresponding to the location of that thumbnail image in the pre-division number switch screen is calculated; this thumbnail image is assumed to have been selected in the pre-division number switch screen and is thus a target image. Then, after the screen division number switch, the arrangement of the thumbnail images in the index view is determined so that the selected thumbnail image is displayed in the calculated location. By determining the arrangement of the thumbnail images in this manner, a large movement in the highlighting can be suppressed when switching the screen division number in the index view.

Note that hereinafter, the "selected thumbnail image" shall be referred to as the "target thumbnail image".

First, in step S401, the location of the target thumbnail image prior to the screen division number switch, or in other words, prior to changing the division method, is obtained. In step S401, the CPU 201 obtains a pre-switch location $X_1$ in the horizontal direction and $Y_1$ in the vertical direction, and stores those locations in the memory 203. Here, "locations" express the locations of each of the regions obtained by dividing a single screen in the index view, using the region in the upper-left corner of the screen as the origin.

For example, when the screen has been divided into three rows by three columns, the location in the horizontal direction of the region in the upper-left corner, which is the origin, is X=1, and the location of that region in the vertical direction is Y=1; likewise, the location of the region in the bottom-right corner in the horizontal direction is X=3, and the location of that region in the vertical direction is Y=3. Meanwhile, when the screen has been divided into, for example, six columns by four rows, the location of the region in the bottom-right corner in the horizontal direction is X=6, whereas the location of that region in the vertical direction is Y=4.

Next, in step S402, the screen division numbers before and after the screen division number switch (before and after changing the division method) are found and stored in, for example, the memory 203. The number of divisions in the horizontal direction before the switch is taken as a division number $N_1$, and the number of divisions in the vertical direction before the switch is taken as a division number H. Likewise, the number of divisions in the horizontal direction after the switch is taken as a division number $N_2$, and the number of divisions in the vertical direction after the switch is taken as a division number $H_2$. For example, when the screen is divided into six columns by four rows before the screen division number switch, the division number $N_1=6$ and the division number $H_1=4$.

Note that the screen division number in the index mode is assumed here to be determined, in advance, to progress incrementally. It is assumed, for example, that three types, or three rows by three columns, four rows by four columns, and six rows by six columns, are determined in advance as the screen division numbers, and that these three types of screen division numbers are switched to sequentially in response to operations made through the input unit 205. However, the invention is not limited thereto, and the input of screen division numbers may be enabled through the input of numerical values for the horizontal and vertical directions based on user operations made through the input unit 205.

Next, in the processes from steps S403 to S412, the display location of the selected thumbnail image after the screen division number switch is calculated. The calculation of the display location is performed based on the divisions of the screen in each edge direction in the index view. In other words, in this example, the location in the horizontal direction of the screen is calculated in steps S403 to S407, and the location in the vertical direction of the screen is calculated in steps S408 to S412. However, the calculations are not limited to this example, and the location in the vertical direction may be calculated first, after which the location in the horizontal direction is calculated.

When calculating location in the horizontal direction, first, in steps S403 to S406, a process is performed for the case where the target thumbnail image prior to the division number switch is on the right end or the left end of the index view. In other words, in step S403, it is determined whether or not the location $X_1$ of the target thumbnail image in the horizontal direction prior to the division number switch is 1. This is a determination as to whether or not the target thumbnail image prior to the division number switch is on the left end of the index view. If it has been determined that the location $X_1=1$, the location $X_2$ of the target thumbnail image in the horizontal direction after the division number switch is set to 1 (step S404). This controls the target thumbnail image to be located on the left end of the index view even after the division number switch.

However, if it has been determined in step S403 that the location $X_1$ is not 1, the procedure moves to step S405, where it is determined whether or not the location $X_1$ of the target thumbnail image in the horizontal direction prior to the division number switch is N. This is a determination as to whether or not the target thumbnail image prior to the division number switch is on the right end of the index view. If it has been determined that the location $X_1=N_1$, the location $X_2$ of the target thumbnail image in the horizontal direction after the division number switch is set to $N_2$ (step S406). This controls the target thumbnail image to be located on the right end of the index view even after the division number switch.

However, if it has been determined in step S405 that the location $X_1$ is not $N_1$, the procedure moves to step S407. In this case, the thumbnail image prior to the division number switch is located neither on the left end nor on the right end in the horizontal direction of the index view. In step S407, the location $X_2$ in the horizontal direction after the switch is calculated using the following Equation (1), based on the ratio between the division number $N_1$ in the horizontal direction before the division number switch and the division number $N_2$ in the horizontal direction after the switch, and the location $X_1$ in the horizontal direction before the switch.

$$X_2=(N_2/N_1)\times X_1 \qquad (1)$$

Note that in Equation (1), decimal values in the calculated location $X_2$ are, for example, rounded off. The invention is not limited thereto, however, and decimal values may be discarded, or may be rounded up.

After the location X2 in the horizontal direction after the division number switch has been calculated in steps S403 to S407, the procedure moves to step S408, where the location Y2 in the vertical direction is calculated in the same manner as the horizontal direction.

When calculating location in the vertical direction, first, in steps S408 to S411, a process is performed for the case where the target thumbnail image prior to the division number switch is on the top end or the bottom end of the index view. In other words, in the present first embodiment, if the target thumbnail image is located at the top end or the bottom end of the index view before the division number switch, the target thumbnail image is placed at the corresponding top end or bottom end of the index view after the division number switch as well.

To be more specific, in step S408, it is determined whether or not the location $Y_1$ of the target thumbnail image in the vertical direction prior to the division number switch is 1. This is a determination as to whether or not the target thumbnail image prior to the division number switch is on the top end of the index view. If it has been determined that the location $Y_1=1$, the location $Y_2$ of the target thumbnail image in the vertical direction after the division number switch is set to 1 (step S409). This controls the target thumbnail image to be located on the top end of the index view even after the division number switch.

However, if in step S408 it has been determined that the location $Y_1$ is not 1, the procedure moves to step S410, where it is determined whether or not the location $Y_1$ of the target thumbnail image in the vertical direction prior to the division number switch is H. This is a determination as to whether or not the target thumbnail image prior to the division number switch is on the bottom end of the index view. If it has been determined that the location $Y_1=H_1$, the location $Y_2$ of the target thumbnail image in the vertical direction after the division number switch is set to $H_2$ (step S411). This controls the target thumbnail image to be located on the bottom end of the index view even after the division number switch.

However, if it has been determined in step S410 that the location Y1 is not H1, the procedure moves to step S412. In this case, the thumbnail image prior to the division number switch is located neither on the top end nor the bottom end in the vertical direction of the index view. In step S412, the location Y2 in the vertical direction after the switch is calculated using the following Equation (2), based on the ratio between the division number H1 in the vertical direction before the division number switch and the division number H2 in the vertical direction after the switch, and the location Y1 in the vertical direction before the switch.

$$Y2=(H2/H1)\times Y1 \qquad (2)$$

Note that in Equation (2), decimal values in the calculated location $Y_2$ are, for example, rounded off. The invention is not limited thereto, however, and decimal values may be discarded, or may be rounded up.

After the locations $X_2$ and $Y_2$ in the horizontal and vertical directions, respectively, of the target thumbnail image after the division number switch have been calculated through the processes from steps S403 to S412, the procedure moves to step S413. In step S413, the post-division number switch arrangement of the thumbnail images aside from the target thumbnail image is determined based on the location $(X_2,Y_2)$. In other words, the overall arrangement of the thumbnail images within the post-division number switch index view is determined so that the target thumbnail image is placed at the location $(X_2,Y_2)$. For example, in the case where the thumbnail images are arranged in a predetermined order, the thumbnail image located at the beginning of the index view is determined so that the target thumbnail image is placed at the location $(X_2,Y_2)$.

Once the post-division number switch location of the target thumbnail image has been determined in step S413, the procedure then moves to step S414, where the thumbnail images are displayed in the index view according to the post-switch division number.

Figure 5:
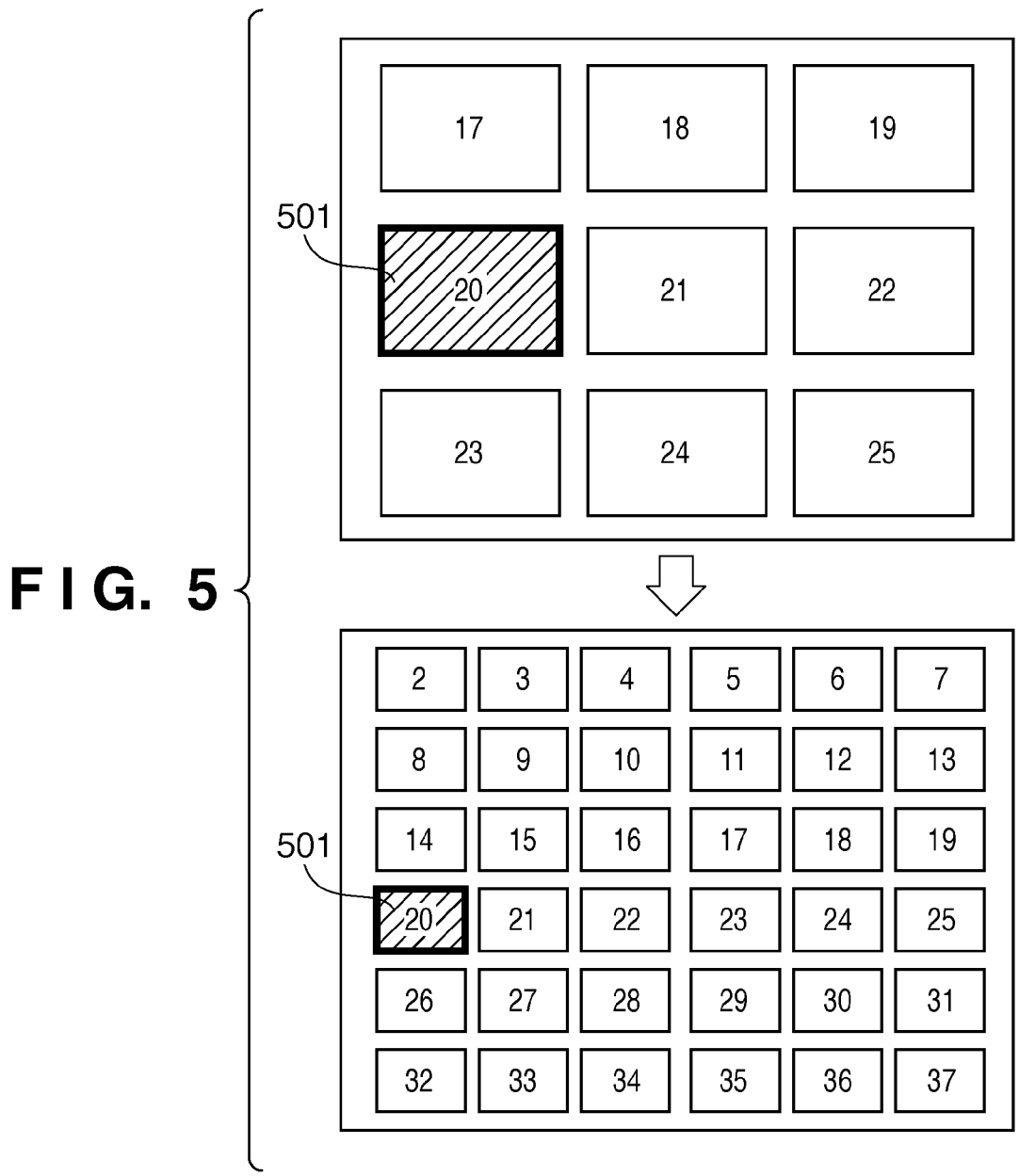
FIG. 5 is a diagram illustrating the screen division number switching process according to the first embodiment of the present invention in more detail.
Figure 6:
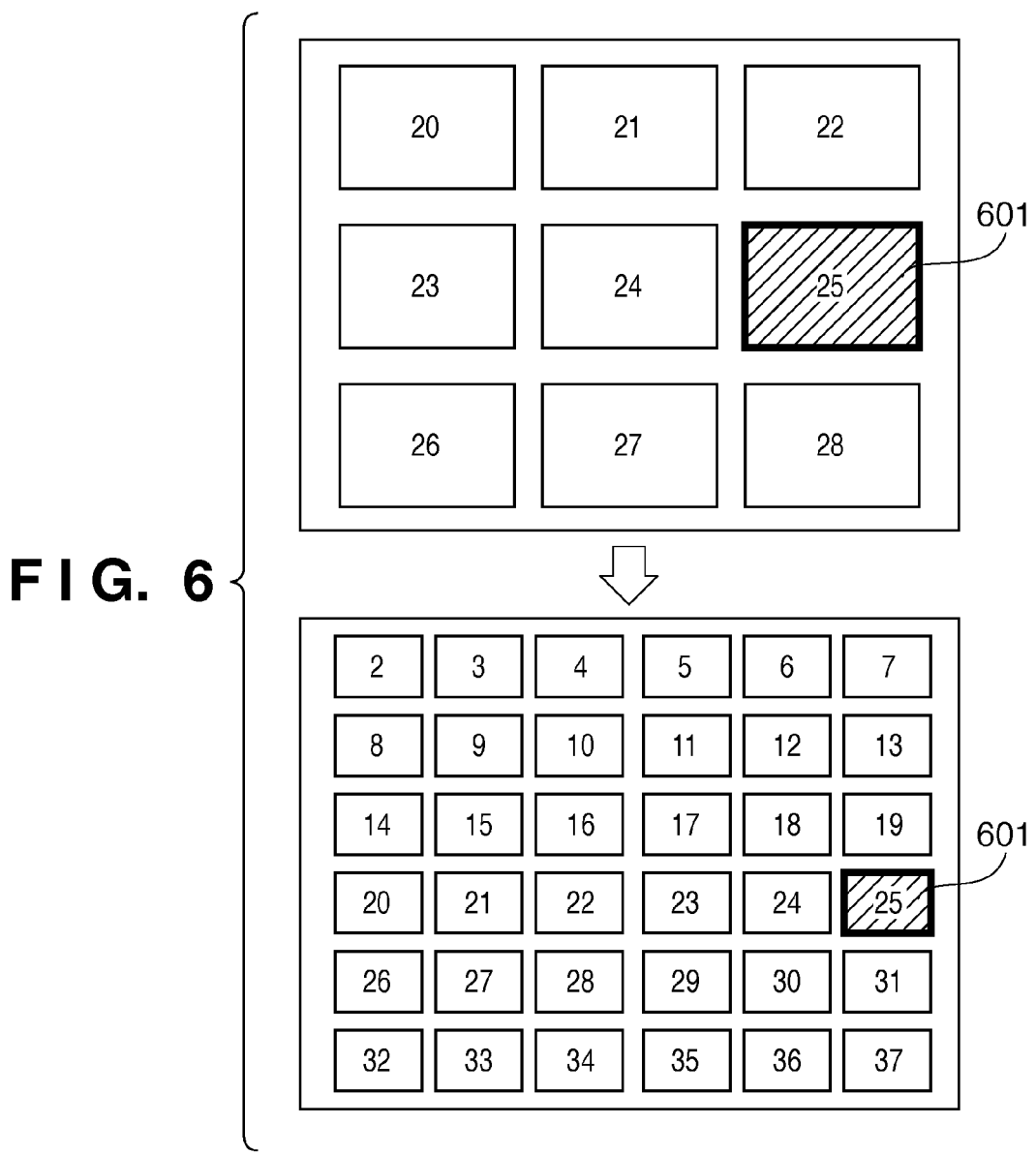
FIG. 6 is a diagram illustrating the screen division number switching process according to the first embodiment of the present invention in more detail.
Figure 7:
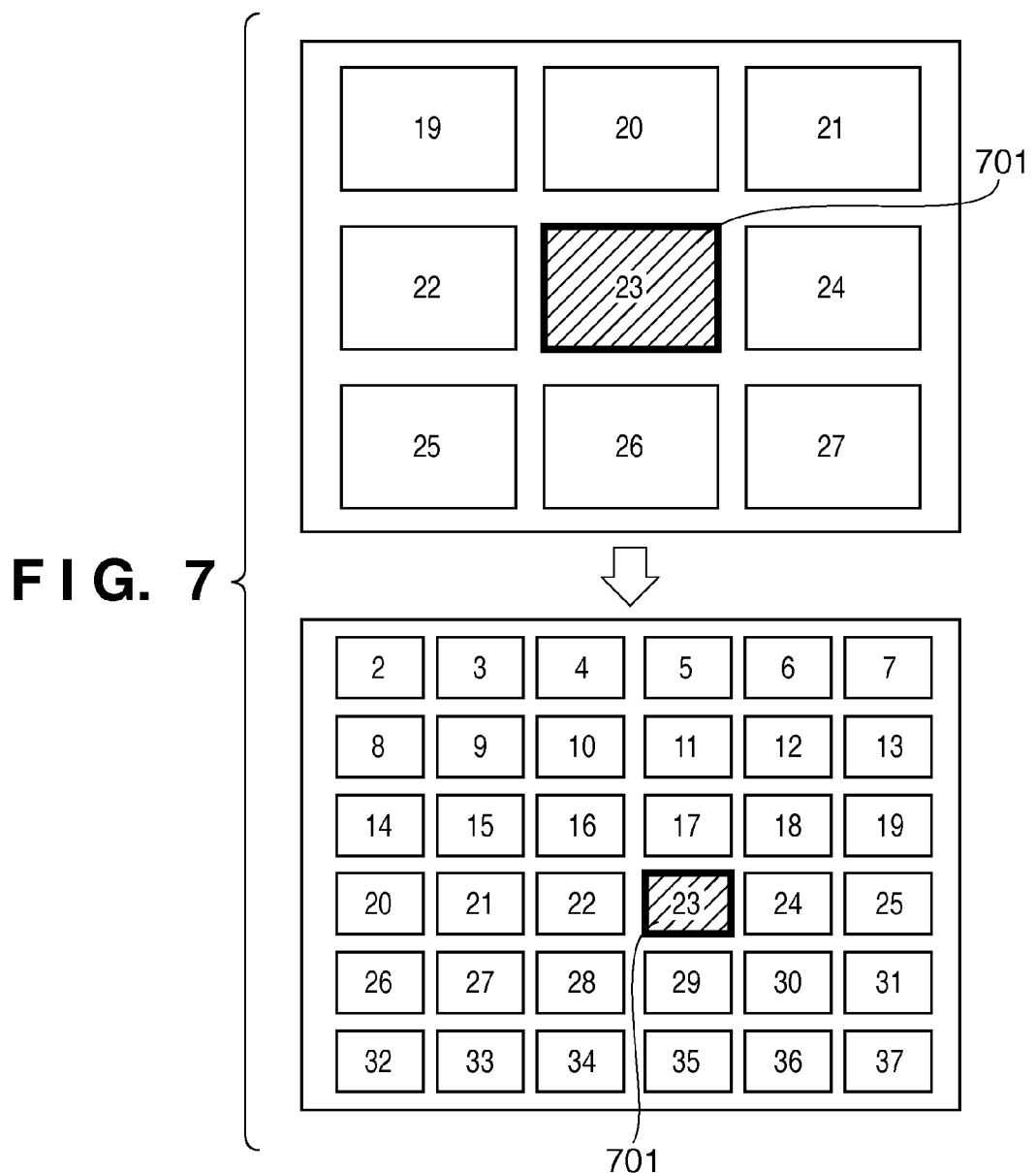
FIG. 7 is a diagram illustrating the screen division number switching process according to the first embodiment of the present invention in more detail.

The processing in the aforementioned flowchart of FIG. 4 shall now be described in further detail using FIGS. 5 through 7. FIGS. 5 through 7 each illustrate examples where the screen division method in the index view is switched from three rows by three columns (a first matrix) to six rows by six columns (a second matrix), thereby switching the division number from nine divisions to thirty-six divisions.

Note that in FIGS. 5 through 7, each square represents a thumbnail image, and the thumbnail images are displayed according to the order of the numbers within the boxes. The box to which diagonal hatching has been added indicates the target thumbnail image. In the following example, the thumbnail images are arranged starting with the smallest number, moving from left to right in the horizontal direction with the upper-left corner of the screen used as the origin, and continuing onto a new row therebelow in the vertical direction. For example, the upper section of FIG. 5 illustrates an index view with nine divisions, in which thumbnail images from number 17 to number 25 are arranged in order. Note that the arrangement order of the thumbnail images is not limited thereto, and another order may be employed.

The upper section of FIG. 5 illustrates an exemplary state of the index view before the division number switch. The index view has nine divisions, or three rows by three columns, with the thumbnail images being arranged in order starting with the thumbnail image number 17 and ending with the thumbnail image number 25; a thumbnail image 501, which is number 20, is selected, and is thus the target thumbnail image. As exemplified in the lower section of FIG. 5, this index view is then switched to a view having thirty-six divisions, or six rows by six columns.

The location $X_1$ of the thumbnail image 501 in the horizontal direction is 1, and thus when the procedure moves to step S404 based on the determination in step S403, the location $X_2$ after the division number switch is 1. Meanwhile, the location $Y_1$ of the thumbnail image 501 in the vertical direction is 2, and thus when the procedure moves to step S412 based on the determination in steps S408 and S410, the location $Y_2$ after the division number switch is calculated using the aforementioned Equation (2). In this example, the number of divisions $H_1$ in the vertical direction before the division number switch is three and the number of divisions $H_2$ after the division number switch is six, and therefore the post-division location $Y_2=(6/3)\times2=4$.

When the index view transits from a state divided into three rows by three columns, as shown in the upper section of FIG. 5, to a state divided into six rows by six columns, as shown in the lower section of FIG. 5, the arrangement of the thumbnail images is determined based on the location $(X_2,Y_2)$ calculated as described above (a reference location). In other words, the overall arrangement of the thumbnail images in the index view is determined so that the target thumbnail image 501 is placed at the location $(X_2,Y_2)$.

In this example, the location $X_2$ is calculated as 1 and the location $Y_2$ is calculated as 4, and thus, as exemplified in the lower section of FIG. 5, the thumbnail image 501 (thumbnail image number 20) is placed at the location (1,4). The thumbnail images that are to be placed at each location in the index view are then found based on the thumbnail image 501. In this example, this results in the thumbnail image number 2 being placed in the upper-left corner of the index view and the subsequent thumbnail images being arranged in numerical order thereafter, thereby placing the thumbnail image 501 at the location (1,4). The thumbnail image 501 placed at the location (1,4) is highlighted, indicating that the thumbnail image 501 is the target thumbnail image.

As shown in the upper and lower sections of FIG. 5, the target thumbnail image is placed in a location in the post-division number switch index view corresponding to its pre-division number switch location, thereby suppressing a large movement in the highlighting from occurring due to the division number switch.

The upper section of FIG. 6 illustrates another exemplary state of the index view before the division number switch. The index view has nine divisions, or three rows by three columns, with the thumbnail images being arranged in order starting with the thumbnail image number 20 and ending with the thumbnail image number 28; a thumbnail image 601, which is number 25, is selected, and is thus the target thumbnail image. As exemplified in the lower section of FIG. 6, this index view is then switched to a view having thirty-six divisions, or six rows by six columns.

The location $X_1$ of the thumbnail image 601 in the horizontal direction is 3, and thus when the procedure moves to step S406 based on the determination in steps S403 and S405, the location $X_2$ after the division number switch is 6. Meanwhile, the location $Y_1$ of the thumbnail image 601 in the vertical direction is 2, and thus when the procedure moves to step S412 based on the determination in steps S408 and S410, the location $Y_2$ after the division number switch is calculated using the aforementioned Equation (2). In this example, the number of divisions $H_1$ in the vertical direction before the division number switch is three and the number of divisions H2 after the division number switch is six, and therefore the post-division location $Y_2=(6/3)\times 2=4$.

When the index view transits from a state divided into three rows by three columns, as shown in the upper section of FIG. 6, to a state divided into six rows by six columns, as shown in the lower section of FIG. 6, the arrangement of the thumbnail images is determined based on the location $(X_2,Y_2)$ calculated as described above. In other words, the overall arrangement of the thumbnail images in the index view is determined so that the target thumbnail image 601 is placed at the location $(X_2,Y_2)$.

In this example, the location $X_2$ is calculated as 6 and the location $Y_2$ is calculated as 4, and thus, as exemplified in the lower section of FIG. 6, the target thumbnail image 601 (thumbnail image number 25) is placed at the location (6,4). The thumbnail images that are to be placed at each location in the index view are then found based on the thumbnail image 601. In this example, this results in the thumbnail image number 2 being placed in the upper-left corner of the index view and the subsequent thumbnail images being arranged in numerical order thereafter, thereby placing the thumbnail image 601 at the location (6,4). The thumbnail image placed at the location (6,4) is highlighted, indicating that the thumbnail image 601 is the target thumbnail image.

As shown in the upper and lower sections of FIG. 6, the target thumbnail image is placed in a location in the post-division number switch index view corresponding to its pre-division number switch location, thereby suppressing a large movement in the highlighting from occurring due to the division number switch.

The upper section of FIG. 7 illustrates yet another exemplary state of the index view before the division number switch. The index view has nine divisions, or three rows by three columns, with the thumbnail images being arranged in order starting with the thumbnail image number 19 and ending with the thumbnail image number 27; a thumbnail image 701, which is number 23, is selected. As exemplified in the lower section of FIG. 7, this index view is then switched to a view having thirty-six divisions, or six rows by six columns.

The location $X_1$ of the thumbnail image 701 in the horizontal direction is 2, and thus when the procedure moves to step S407 based on the determination in steps S403 and S405, the location $X_2$ after the division number switch is calculated through the aforementioned Equation (1). In this example, the division number $N_1$ in the horizontal direction before the division number switch is 3, and the division number $N_2$ after the switch is 6, and thus the post-division location $X_2=(6/3)\times 2=4$. Meanwhile, the location $Y_1$ of the thumbnail image 701 in the vertical direction is 2, and thus when the procedure moves to step S412 based on the determination in steps S408 and S410, the location $Y_2$ after the division number switch is calculated using the aforementioned Equation (2). In this example, the number of divisions $H_1$ in the vertical direction before the division number switch is three and the number of divisions $H_2$ after the division number switch is six, and therefore the post-division location $Y_2=(6/3)\times 2=4$.

When the index view transits from a state divided into three rows by three columns, as shown in the upper section of FIG. 7, to a state divided into six rows by six columns, as shown in the lower section of FIG. 7, the arrangement of the thumbnail images is determined based on the location $(X_2,Y_2)$ calculated as described above. In other words, the overall arrangement of the thumbnail images in the index view is determined so that the target thumbnail image 701 is placed at the location $(X_2,Y_2)$.

In this example, the location $X_2$ is calculated as 4 and the location $Y_2$ is calculated as 4, and thus, as exemplified in the lower section of FIG. 7, the thumbnail image 701 (thumbnail image number 23) is placed at the location (4,4). The thumbnail images that are to be placed at each location in the index view are then found based on the thumbnail image 701. In this example, this results in the thumbnail image number 2 being placed in the upper-left corner of the index view and the subsequent thumbnail images being arranged in numerical order thereafter. As a result, the thumbnail image 701 is placed at the location (4,4). The thumbnail image 701 placed at the location (4,4) is highlighted, indicating that the thumbnail image 701 is the target thumbnail image.

As shown in the upper and lower sections of FIG. 7, the target thumbnail image is placed in a location in the post-division number switch index view corresponding to its pre-division number switch location, thereby suppressing a large movement in the highlighting from occurring due to the division number switch.

Here, the method for arranging the thumbnail images shall be described in further detail. As one example, assume that the numbers in the squares shown in the aforementioned FIGS. 5 through 7 express the order of images stored in the external storage medium 208, and that the order is based upon the shooting date/time of the images. Thumbnail images of these images are arranged according to this order in the index views exemplified in FIGS. 5 to 7.

In the example in the upper section of FIG. 7, the image indicated by the target thumbnail image 701 is the twenty-third image stored in the storage medium. In the post-division number switch state shown in the lower section of FIG. 7, the thumbnail image 701 is placed at the location (4,4), or in other words, in the fourth row and the fourth column. Based on this, it is determined what the number of the image to be placed in the upper-left corner of the index view is among the images stored in the storage medium. In the example shown in the lower section of FIG. 7, the image to be placed in the upper-left corner is the second image, and thus the image files are read out from the external storage medium 208 in order, starting with that second image and progressing to the third, fourth, and so on; thumbnail images are generated therefor and are displayed in the index view in order starting from the upper-left corner. The display process ends when the thumbnail image of the image number 37, which is to be placed in the lower-right corner of the index view, has been displayed.

As described thus far, in the present first embodiment, the processes of steps S403 to S412 make it possible to reduce the gap between the display location of the target thumbnail image before the division number switch and the display location of the target thumbnail image after the division number switch. Through this, visual movement in the index view when switching the screen division number can be suppressed, thereby making it possible to prevent users from losing sight of selected images.

Here, when displaying thumbnail images in the display 210 using an index view, a greater number of screen divisions results in a greater amount of time required to display all the thumbnail images in a single screen. There are thus cases where a long wait is required before the target thumbnail image is actually displayed, depending on the display location of the target thumbnail image. Accordingly, displaying, in advance, only the highlighting in the location where the target thumbnail image is to be displayed prior to the target thumbnail image actually being displayed is possible. This makes it possible to prevent users from visually losing the highlighting.

Figure 8:
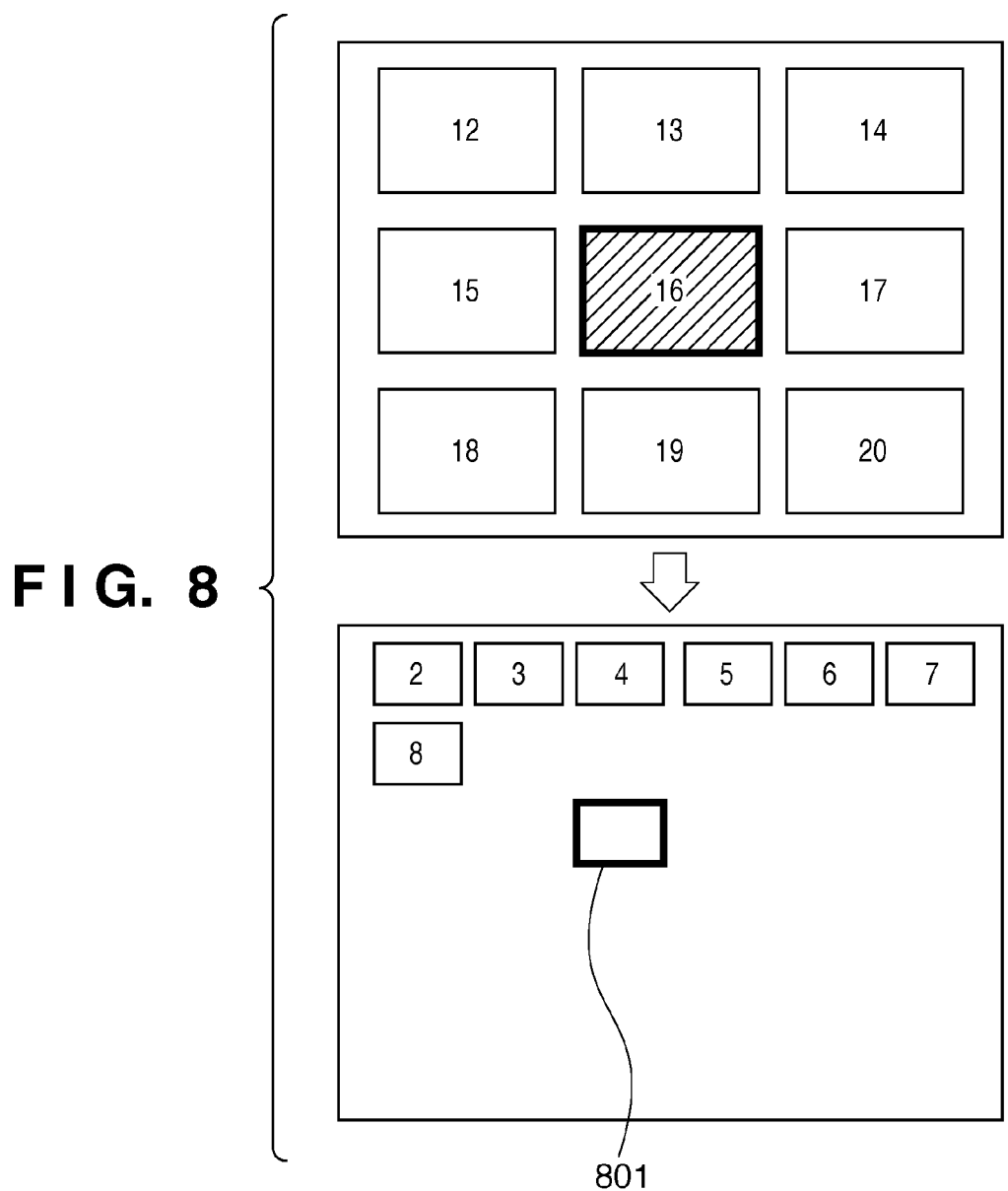
FIG. 8 is a diagram illustrating an advanced display of only highlighting in the location where a target thumbnail image is to be displayed prior to the target thumbnail image actually being displayed.

FIG. 8 illustrates an example of a case where a three-row-by-three-column index view (see the upper section of FIG. 8) is switched to a six-row-by-six-column index view (see the lower section of FIG. 8). The example of FIG. 8 illustrates a situation in which, when the division number is switched, images have been sequentially read out from the external storage medium 208, thumbnail images have been generated therefor, and the display process has progressed as far as image number 8, but the images following image number 8 have not yet been displayed.

In the three-row-by-three-column index view exemplified in the upper section of FIG. 8, the thumbnail image located at number 16 is the target thumbnail image, and therefore the target thumbnail image is placed in the location of number 16 in the six-row-by-six-column index view after the division number switch as well. Here, when the display process is executed in order starting with the thumbnail image in the upper-left corner, highlighting 801 is displayed in advance at the location where the target thumbnail image is to be displayed, before the target thumbnail image is actually displayed at the location of number 16 (see the lower section of FIG. 8). This prevents a user from losing sight of the thumbnail image number 16, which is the selected thumbnail image.

It is also possible to enlarge the target thumbnail image when all thumbnail images to be displayed in the single screen have been displayed after the division number has been switched in the index view, as indicated by a thumbnail image 901 in FIG. 9. In the example of FIG. 9, when the division number of the index view is switched from three rows by three columns, as shown in the upper section of FIG. 9, to six rows by six columns, as shown in the lower section of FIG. 9, the target thumbnail image 901 is displayed at a larger size than the other thumbnail images in the six-row-by-six-column index view after the switch. This makes it possible to communicate to the user that all the thumbnail images to be displayed in the single screen have been displayed. In addition, because the size of each thumbnail image is reduced when the division number in the index view is higher, this prevents the images from becoming difficult to distinguish. This furthermore makes it possible to emphasize the display location of the target thumbnail image. It is possible to restore the enlarged thumbnail image to its original size after, for example, a predetermined amount of time has elapsed, in response to user operations, or the like.

Note that it is also possible to combine the advanced display of the highlighting 801 as described using FIG. 8 with the enlarged display of the target thumbnail image as described using FIG. 9. In other words, the highlighting may be displayed in advance prior to actually displaying all of the thumbnail images that are to be displayed in the index view, and then the target thumbnail image may be enlarged once all the thumbnail images have been displayed. This makes it possible to emphasize the display location of the target thumbnail image.

Figure 10:
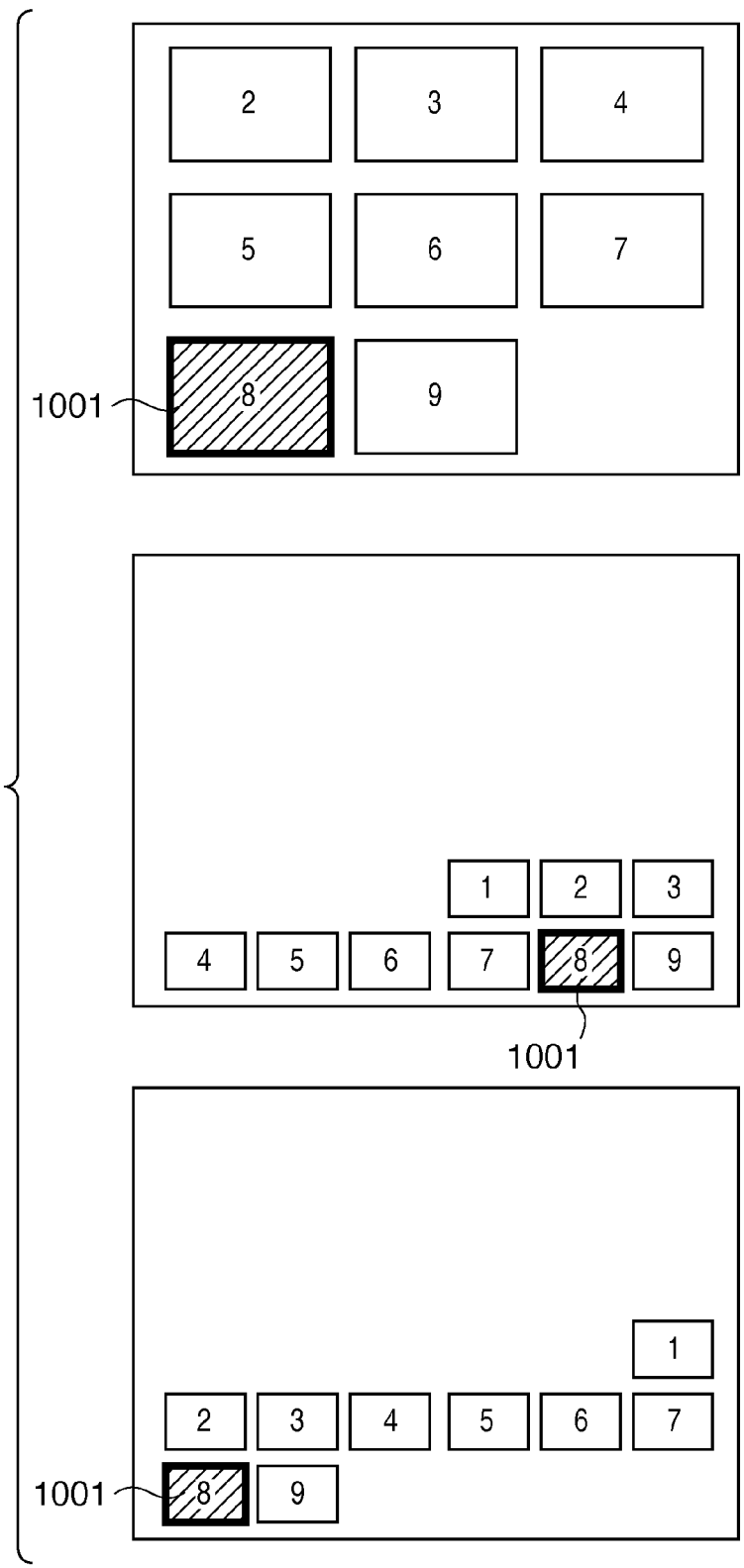
FIG. 10 is a diagram illustrating an example of processing performed when the number of displayable images is smaller than the number of screen divisions in an index view.

Next, a case shall be considered in which the number of displayable images, such as the number of images stored in the external storage medium 208, is lower than the number of screen divisions in the index view. In this case, if the thumbnail images are arranged starting with the upper-left corner of the screen as per conventional techniques, regions in which no thumbnail images are displayed (the bottom-right corner of the screen) will appear, as exemplified in the upper section of FIG. 10. If the number of divisions in the screen is then switched, the thumbnail images have conventionally been pushed to the top or bottom end of the screen, as exemplified in the middle section of FIG. 10. In this case, there is the possibility that the location of a target thumbnail image 1001 will move significantly due to a division number switch. However, setting the post-division number switch location of the target thumbnail image to a location corresponding to the pre-division number switch location of that thumbnail image, as per the present first embodiment, makes it possible to prevent such significant movement of the thumbnail image (see the bottom section of FIG. 10).

Although processing for the case where the target thumbnail image is located at an end of the screen is executed in steps S403 to S406 and steps S408 to S411 in the aforementioned flowchart of FIG. 4, it should be noted that these processes can be omitted. However, in this case, if a division number switch that increases the number of screen divisions is performed, it cannot be ensured with certainty that a target thumbnail image located at an end of the screen before the switch will be placed at an end of the screen in the post-switch index view.

<Example of Application of First Embodiment>

A case where the input unit 205 is configured as a touch panel integrated with the display 210 as mentioned above shall be described as an example of the application of the present first embodiment. For example, the CPU 201 provides a GUI so that, when a collection of thumbnail images is displayed in an index view, the number of divisions of the screen is switched when the location of the target thumbnail image is touched on the touch panel. Then, as described above, the post-division number switch location of the target thumbnail image is set to a location corresponding to the pre-division number switch location of that thumbnail image. Because movement of the location of the target thumbnail image resulting from the division number switch is suppressed, it is possible to, for example, sequentially switch the number of screen divisions by repeatedly touching the same position on the screen, making smooth operations possible.

<Second Embodiment>

Next, a second embodiment of the present invention shall be described. In the present second embodiment, the location of a target thumbnail image in an index view prior to a division number switch is stored, and the screen division number is then switched. After this, when the number of screen divisions is restored to a division number from a point in time in which a previous location was stored without changing the target thumbnail image, the target thumbnail image is placed in the stored location.

In other words, according to the method of the aforementioned first embodiment, the location of the target thumbnail image may move, despite the target thumbnail image not being changed, if the number of screen divisions is switched and then restored to a previous division number.

This shall be described using FIGS. 11A through 11D. First, it is assumed that the index view has, as exemplified in FIG. 11A, thirty-six divisions, or six rows by six columns, and that a target thumbnail image 1101 is present at a location (3,3). The division number is then assumed to be switched from the state shown in FIG. 11A to nine divisions, or three rows by three columns, as exemplified in FIG. 11B. If the flowchart in the aforementioned FIG. 4 is followed, the location $(X_2,Y_2)$ of the target thumbnail image 1101 after the division number switch is calculated through the aforementioned Equations (1) and (2) as shown hereinafter, after which the values are rounded up to the nearest whole number, resulting in a location of (2,2):

$$X_2=(3/6)\times3=1.5$$

$$Y_2=(3/6)\times3=1.5$$

Figure 11A:
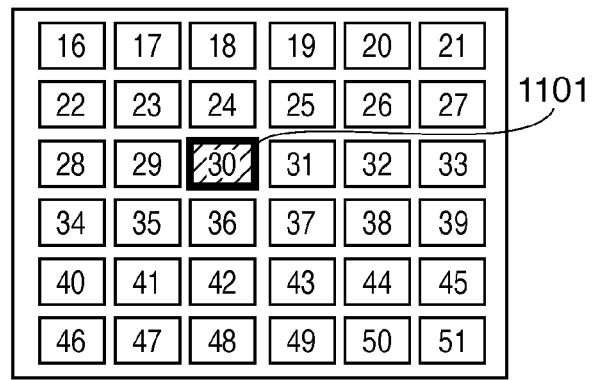
FIGS. 11A to 11D are diagrams illustrating an outline of a screen division number switching process according to a second embodiment of the present invention.
Figure 11B:
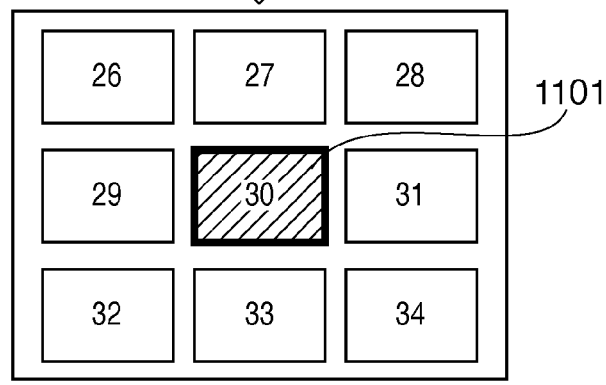
Figure 11C:
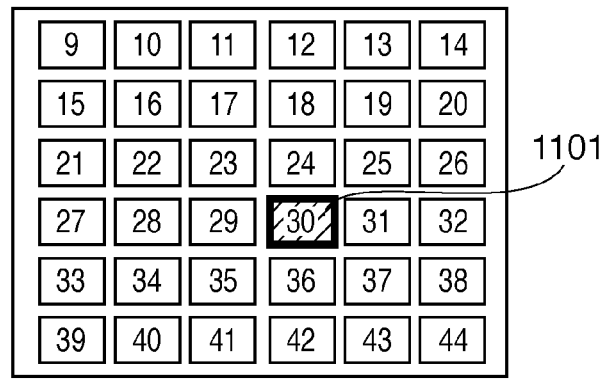

Next, when the division number (matrix used for arrangement) is once again switched to thirty-six divisions, or six rows by six columns, from the state shown in FIG. 11B, the location of the target thumbnail image 1101 is the location (4,4), as shown in FIG. 11C; this is similar to the situation described using FIG. 7. This location is different from the location of the target thumbnail image in the original state shown in FIG. 11A.

Figure 11D:
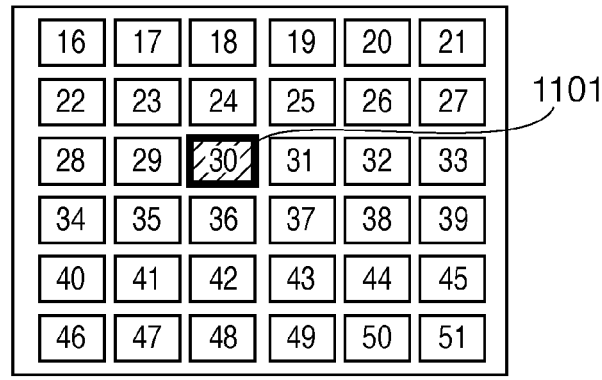

Accordingly, in the present second embodiment, the location of the target thumbnail image prior to the division number switch is stored. Then, when the division number is, after the division number switch, restored to the original division number without changing the selection of the thumbnail image, that thumbnail image is placed at the stored location (FIG. 11D). This prevents the highlighting from moving when the division number is restored.

FIG. 12 is a flowchart illustrating an outline of an exemplary process performed during the index mode according to the present second embodiment. Each process in the flowchart shown in FIG. 12 is realized by the CPU 201 expanding a program stored in the hard disk 202 or the like in the memory 203 and executing that program.

First, in step S801, it is determined whether or not an initial display is necessary in the index mode. If it has been determined that the initial display is necessary, the procedure moves to step S802. For example, if the image display mode has just been switched from the single mode to the index mode, it is determined that the initial display is necessary, and the process moves to step S802.

In step S802, a process for displaying the initial screen of the index mode in the display 210 is performed, in the same manner as in the aforementioned step S302 of the flowchart in FIG. 3. In other words, the CPU 201 reads out, from, for example, the external storage medium 208, a number of images equivalent to the number of screen divisions in the index mode, using the image displayed in the single mode immediately prior to step S801 as a basis. The CPU 201 then generates thumbnail images from each of the read-out images and displays the generated thumbnail images in the display 210 arranged in a predetermined order, thereby composing an index view. When the initial screen display process has ended, the procedure moves to step S809, which shall be described later.

If, however, it has been determined in the aforementioned step S801 that the initial display is unnecessary, the procedure moves to step S803. In step S803, the apparatus stands by for a user operation made through the input unit 205, and when a user operation has been made, it is determined whether or not that user operation is an operation for requesting a screen division number switch in the index view.

If it has been determined that the user operation is an operation requesting a screen division number switch, the procedure moves to step S804, where, through a process that shall be described later, the number of screen divisions in the index view is switched. Then, when the number of screen divisions has been switched, the procedure moves to step S805. In step S805, the CPU 201, serving as a storage unit, associates the current highlighting location, or in other words, the current location of the target thumbnail image, with the current screen division number (matrix used for arrangement), and stores those associated items. The current location of the target thumbnail image and the screen division number (matrix used for arrangement) may be stored in the memory 203, or may be stored within a register or the like within the CPU 201. Because the highlighting location is stored for each screen division number (matrix used for arrangement), switching the screen division number between multiple levels without changing the selection of the thumbnail image will result in a multiple number of locations, equivalent to the number of switched levels, being stored. Once the current highlighting location has been stored, the procedure moves to step S809.

However, if it has been determined in step S803 that the user operation was not an operation requesting a screen division number switch, the procedure moves to step S806, where it is determined whether or not the user operation is a highlighting movement operation. If it has been determined that the user operation is a highlighting movement operation, the procedure moves to step S807, where a highlighting movement process is carried out in response to the user operation. For example, the target thumbnail image is changed in response to the user operation, and highlighting is displayed for the new target thumbnail image. At the same time, in step S807, all of the highlighting locations stored in the memory 203 are reset. "Resetting the highlighting locations" mentioned here refers to a process for clearing the highlighting locations stored in association with matrices aside from the current matrix, and re-storing the pre-switch highlighting location, stored in association with the current matrix, at the location where the target thumbnail image changed by the highlighting movement is present. When the process of step S807 ends, the procedure moves to step S809.

However, if it has been determined in step S806 that the user operation was not a highlighting movement operation, the procedure moves to step S808. In step S808, other processes, or processes aside from the screen division number switching process and the highlighting movement for the index view, are performed. These "other processes" are not particularly limited, but switching the display of information related to an image, displaying a menu, or the like can be thought of as processes related to the present second embodiment. When these other processes have ended, the procedure moves to step S809.

As described above, when the processes of step S802, S805, S807, or S808 end, the procedure moves to step S809. In step S809, it is determined whether or not an end event causing the index mode to end has occurred. If it has been determined that an end event has not occurred, the procedure returns to step S801. However, if it has been determined that an end event has occurred, the series of index mode processes ends.

An end event occurs when, for example, an image display mode aside from the index mode has been selected through user operations, the operational mode of the display control apparatus 200 is switched to a mode aside from the image display mode, and so on. However, the occurrence of an end event is not limited thereto, and an end event also occurs when an operation to power off the apparatus has been accepted, when the display control apparatus 200 runs on batteries and it is detected that the battery power has been exhausted, and so on. Furthermore, an end event can be caused to occur when no user operations have been made through the input unit 205 for a predetermined amount of time.

Figure 13:
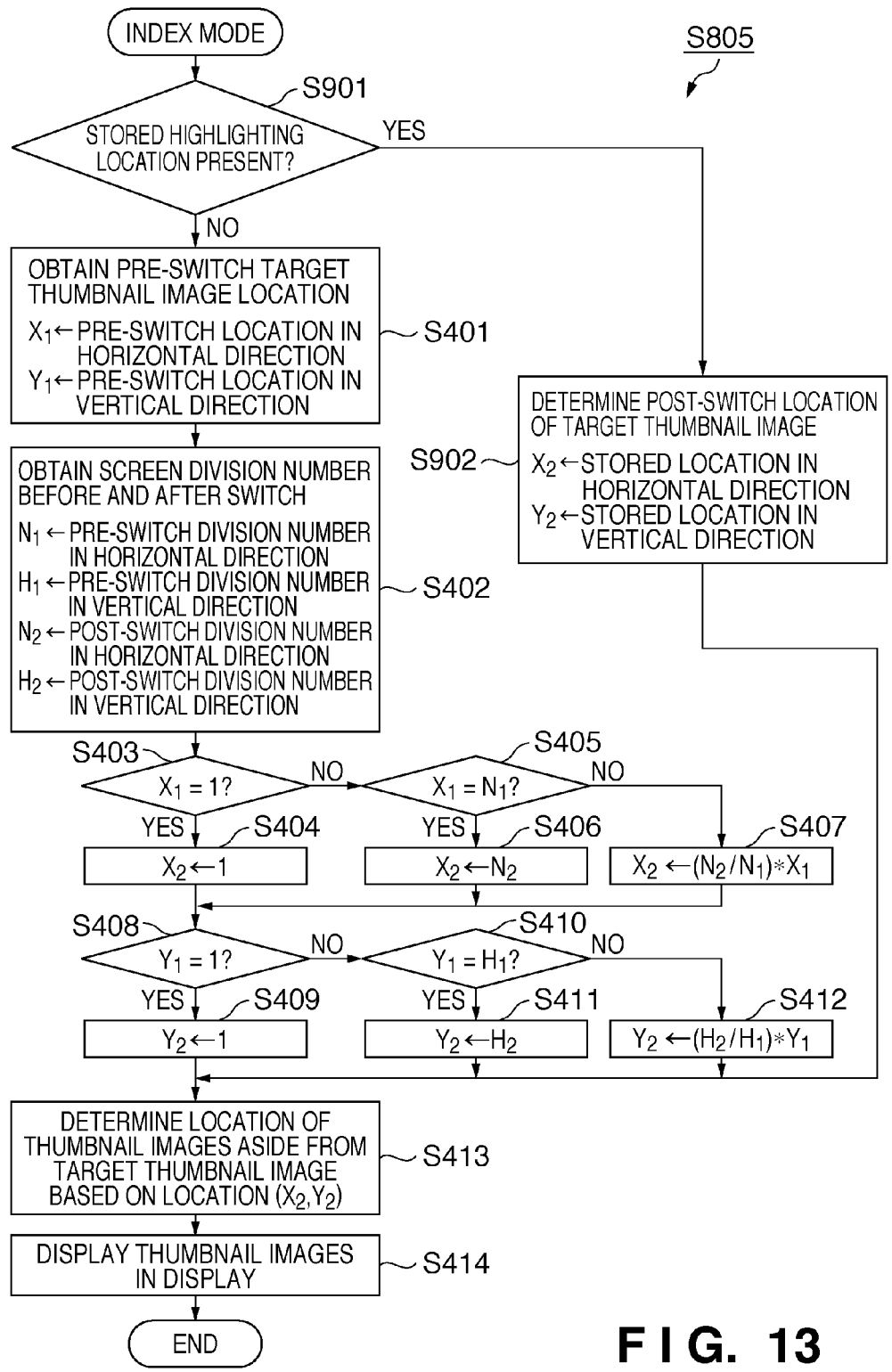
FIG. 13 is a flowchart illustrating an example of a screen division number switching process according to the second embodiment of the present invention.

Next, the screen division number switching process of step S804 in the aforementioned flowchart of FIG. 12 shall be described in further detail. FIG. 13 is a flowchart illustrating an example of a screen division number switching process according to the present second embodiment. Note that the processes in the flowchart of FIG. 13 that are common with those in the aforementioned flowchart of FIG. 4 shall be given the same reference numerals, and detailed descriptions thereof shall be omitted.

First, in step S901, it is determined whether or not a highlighting location is stored in the memory 203 and whether or not the screen division number stored in association with that highlighting location matches the screen division number after the division number switch. If it has been determined that a highlighting location is not stored, or that the screen division number (matrix used for arrangement) stored in association with a stored highlighting location does not match the screen division number (matrix) after the division number switch, the procedure moves to step S401. From step S401 on, the location $(X_2,Y_2)$ of the target thumbnail image after the division number switch is calculated according to the processes from step S401 to step S412 in the aforementioned flowchart of FIG. 4. The procedure then moves to step S413.

However, if in step S901 it has been determined that information expressing a highlighting location is stored in the memory 203 and that the screen division number stored in association with the highlighting location matches the screen division number after the division number switch, the procedure moves to step S902. In step S902, the highlighting location is read out from the memory 203, and the highlighting location read out from the memory 203 is set as the location $(X_2,Y_2)$ of the target thumbnail image after the division number switch. The procedure then moves to step S413.

In step S413, the post-division number switch arrangement of the thumbnail images aside from the target thumbnail image is determined based on the location $(X_2,Y_2)$ found in the aforementioned step S902, or found in steps S409, S411, or S412. Then, in step S414, an index view of the thumbnail images is displayed in accordance with the post-switch division number.

Performing such a process makes it possible to, when the division number in an index view is switched and then restored to the original division number, ensure that the highlighting location in an index view having the same screen division number is in the same location, as long as the selection of the thumbnail image has not been changed. For example, assume that an operation is performed so that the division number is switched from the six-row-by-six-column state shown in the aforementioned FIG. 11A to a three-row-by-three-column state as shown in FIG. 11B without moving the highlighting, and that a switch is then made to a six-row-by-six-column state as shown in FIG. 11D, once again without moving the highlighting. In this case, the highlighting is placed in the same location in index views having the same screen division number (matrix), as can be understood by comparing FIG. 11A with FIG. 11D.

Accordingly, according to the present second embodiment, it is possible to prevent a situation where the display location of a target thumbnail image changes when switching the division number in an index view despite the target thumbnail image not been changed, or in other words, despite the highlighting not being moved.

Although the aforementioned embodiments have described examples in which the present invention is applied in a personal computer, the invention is not limited to this example. In other words, the present invention may also be applied in an imaging apparatus such as a digital camera. That is to say that the present invention can also be applied when captured images stored in a storage medium that can be read by a digital camera, such as a memory card, are displayed as an index view in a display provided in the digital camera, such as a rear-panel liquid crystal device. The present invention can furthermore be applied in any device capable of displaying images in an index view, including mobile telephone terminals, mobile image viewers, displays provided in printer devices for selecting and checking images to be printed, digital photo frames, and so on.

In addition, although the aforementioned descriptions discuss the thumbnail images as being arranged in the screen in a two-dimensional manner, the invention is not limited to this example. For example, the present invention can also be applied in the case where the thumbnail images are arranged in a one-dimensional manner (linearly). Furthermore, the present invention can also be applied in a case where the thumbnail images are arranged in a virtual three-dimensional space.

<Other Embodiments>

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-17129, filed on Jan. 28, 2009, which is hereby incorporated by reference herein in its entirety.

What is claimed is:

1. A display control apparatus comprising:
   a display control unit that performs control so that multiple images arranged in a matrix made up of multiple columns and multiple rows are displayed in a display unit;
   a changing unit that changes the matrix for arranging the multiple images displayed by the display control unit from a first matrix to a second matrix in which the number of columns, rows, or both columns and rows is different from the first matrix; and
   a control unit that, when a change is performed by the changing unit, decides a reference column and row in the second matrix such that a displayed position, on the display unit, of the reference column and row corresponds to a displayed position, on the display unit, of a column and row in which a selected image in the first matrix is located, and controls the display control unit to arrange the multiple images in the second matrix so that the selected image is located in the reference column and row.

2. The display control apparatus according to claim 1, wherein the control unit includes a calculation unit that calculates the reference column and row based on the column and row in which the selected image is located in the first matrix, the number of columns and rows in the first matrix, and the number of columns and rows in the second matrix.

3. The display control apparatus according to claim 2, wherein the calculation unit calculates the reference row and column so that the ratio between the reference row and the number of rows in the second matrix corresponds to the ratio between the row in the first matrix in which the selected image is located and the number of rows in the first matrix, and so that the ratio between the reference column and the number of columns in the second matrix corresponds to the ratio between the column in the first matrix in which the selected image is located and the number of columns in the first matrix.

4. The display control apparatus according to claim 1,
wherein the reference row is a row based on a value obtained by dividing the number of rows in the second matrix by the number of rows in the first matrix and then multiplying the resultant of that division by the value of the row in the first matrix in which the selected image is located; and
the reference column is a column based on a value obtained by dividing the number of columns in the second matrix by the number of columns in the first matrix and then multiplying the resultant of that division by the value of the column in the first matrix in which the selected image is located.

5. The display control apparatus according to claim 1,
wherein in the case where the row in the first matrix in which the selected image is located is a row at an end of the first matrix, the control unit uses, as the reference row, the row at the end of the second matrix that corresponds to the row at the end of the first matrix in which the selected image is located; and
in the case where the column in the first matrix in which the selected image is located is a column at an end of the first matrix, the control unit uses, as the reference column, the column at the end of the second matrix that corresponds to the column at the end of the first matrix in which the selected image is located.

6. The display control apparatus according to claim 1, wherein when a change is performed by the changing unit, the control unit controls the display control unit to arrange the multiple images in the second matrix in a specific order so that the selected image is located in the reference column and row.

7. The display control apparatus according to claim 1, further comprising:
a recording control unit that performs control so that a pair of the column and row of the selected image in a matrix is recorded into a storage unit in association with that matrix, and in the case where the selected image has been changed, pairs of the column and row recorded in association with matrices aside from the current matrix are cleared and the pair of the column and row recorded in association with the current matrix is replaced by a pair of a column and row in which the changed selected image is located in the current matrix,
wherein, in the case where the first matrix has been changed to the second matrix by the changing unit and a pair of a column and row associated with the second matrix is stored in the storage unit, the control unit uses that stored pair of column and row as the reference column and row.

8. The display control apparatus according to claim 1, wherein, when a change has been made by the changing unit, the display control unit performs control so that an identification display indicating the reference column and row is displayed in the second matrix until the selected image is displayed in the reference column and row in the second matrix.

9. The display control apparatus according to claim 1, wherein the display control unit performs control so that the selected image located in the reference column and row in the second matrix is displayed at a larger size than the other images arranged in the second matrix.

10. The display control apparatus according to claim 1,
wherein the display unit is configured of a touch panel; and
the changing unit performs the change in response to one of the multiple images arranged in the first matrix and displayed in the display unit being touched.

11. The display control apparatus according to claim 1, wherein the display control apparatus is a digital camera.

12. The display control apparatus according to claim 1, wherein a displayed position, on the display unit, of the selected image arranged in the second matrix under the control of the control unit is proximate to or the same as a displayed position, on the display unit, of the selected image arranged in the first matrix.

13. The display control apparatus according to claim 1, wherein a displayed region, on the display unit, of the selected image arranged in the second matrix under the control of the control unit at least partly overlaps a displayed region, on the display unit, of the selected image arranged in the first matrix.

14. The display control apparatus according to claim 1, wherein the multiple images in the second matrix is a group of images which is determined dependent on a column and row in which the selected image in the first matrix is located.

15. A display control method comprising:
a display control step of performing control so that multiple images arranged in a matrix made up of multiple columns and multiple rows are displayed in a display unit;
a changing step of changing the matrix for arranging the multiple images displayed by the display control step from a first matrix to a second matrix in which the number of columns, rows, or both columns and rows is different from the first matrix; and
a control step of, when a change is performed by the changing step, deciding a reference column and row in the second matrix such that a displayed position, on the display unit, of the reference column and row corresponds to a displayed position, on the display unit, of a column and row in which a selected image in the first matrix is located, and controlling the display control step to arrange the multiple images in the second matrix so that the selected image is located in the reference column and row.

16. A non-transitory computer-readable storage medium embodying a computer program therein that causes a computer to execute a display control method comprising:
a display control step of performing control so that multiple images arranged in a matrix made up of multiple columns and multiple rows are displayed in a display unit;
a changing step of changing the matrix for arranging the multiple images displayed by the display control step from a first matrix to a second matrix in which the number of columns, rows, or both columns and rows is different from the first matrix; and a control step of, when a change is performed by the changing step, deciding a reference column and row in the second matrix such that a displayed position, on the display unit, of the reference column and row corresponds to a displayed position on the display unit, of a column and row in which a selected image in the first matrix is located, and controlling the display control step to arrange the multiple images in the second matrix so that the selected image is located in the reference column and row.

17. A display control apparatus comprising:

a display control unit that performs control so that multiple images arranged in a matrix made up of multiple columns and multiple rows are displayed in a display unit;

a changing unit that changes the matrix for arranging the multiple images displayed by the display control unit from a first matrix to a second matrix in which the number of columns, rows, or both columns and rows is different from the first matrix; and a control unit that, when a change is performed by the changing unit, controls the display control unit to arrange the multiple images in the second matrix so that the selected image is displayed in the second matrix at a display region which at least partly overlaps a display region at which the selected image is displayed in the first matrix.

18. A display control apparatus comprising:

a display control unit that performs control so that multiple images arranged in a matrix made up of multiple columns and multiple rows are displayed in a display unit;

a changing unit that changes the matrix for arranging the multiple images displayed by the display control unit from a first matrix to a second matrix in which the number of columns, rows, or both columns and rows is different from the first matrix; and a control unit that, when a change is performed by the changing unit, controls the display control unit to arrange the multiple images in the second matrix so that the selected image is displayed in the second matrix at a display region which is located proximate to or at the same position of a display region at which the selected image is displayed in the first matrix.

19. A display control apparatus comprising:

a display control unit that performs control so that multiple images arranged in a matrix made up of multiple columns and multiple rows are displayed in a display unit;

a changing unit that changes the matrix for arranging the multiple images displayed by the display control unit from a first matrix to a second matrix in which the number of columns, rows, or both columns and rows is different from the first matrix;

a deciding unit that decides a location, on the display unit, at which the second image is to be displayed in the second matrix, the decision being made based on a location, on the display unit, at which the selected image is displayed in the first matrix; and a control unit that, when a change is performed by the changing unit, controls the display control unit to arrange the multiple images in the second matrix so that the selected image is displayed in the second matrix at the location decided by the deciding unit.

20. A display control apparatus comprising:

a display control unit that performs control so that multiple images arranged in a two-dimensional layout are displayed in a display unit;

a changing unit that changes the two-dimensional layout for arranging the multiple images displayed by the display control unit from a first two-dimensional layout to a second two-dimensional layout in which the number of images is different from the first two-dimensional layout; and a control unit that, when a change is performed by the changing unit, controls the display control unit to arrange the multiple images in the second two-dimensional layout so that the selected image is displayed in the second two-dimensional layout at a display region which at least partly overlaps a display region at which the selected image is displayed in the first two-dimensional layout.

21. A display control apparatus comprising:

a display control unit that performs control so that multiple images arranged in a two-dimensional layout are displayed in a display unit;

a changing unit that changes the two-dimensional layout for arranging the multiple images displayed by the display control unit from a first two-dimensional layout to a second two-dimensional layout in which the number of images is different from the first two-dimensional layout;

a deciding unit that decides a location, on the display unit, at which the second image is to be displayed in the second two-dimensional layout, the decision being made based on a location, on the display unit, at which the selected image is displayed in the first two-dimensional layout; and a control unit that, when a change is performed by the changing unit, controls the display control unit to arrange the multiple images in the second two-dimensional layout so that the selected image is displayed in the second two-dimensional layout at the location decided by the deciding unit.

22. A display control method comprising:

a display control step of performing control so that multiple images arranged in a matrix made up of multiple columns and multiple rows are displayed in a display unit;

a changing step of changing the matrix for arranging the multiple images displayed by the display control step from a first matrix to a second matrix in which the number of columns, rows, or both columns and rows is different from the first matrix; and a control step of, when a change is performed by the changing step, controlling the display control step to arrange the multiple images in the second matrix so that the selected image is displayed in the second matrix at a display region which at least partly overlaps a display region at which the selected image is displayed in the first matrix.

23. A display control method comprising:

a display control step of performing control so that multiple images arranged in a matrix made up of multiple columns and multiple rows are displayed in a display unit;

a changing step of changing the matrix for arranging the multiple images displayed by the display control step from a first matrix to a second matrix in which the number of columns, rows, or both columns and rows is different from the first matrix; and a control step of, when a change is performed by the changing step, controlling the display control step to arrange the multiple images in the second matrix so that the selected image is displayed in the second matrix at a display region which is located proximate to or at the same position of a display region at which the selected image is displayed in the first matrix.

24. A display control method comprising:
- a display control step of performing control so that multiple images arranged in a matrix made up of multiple columns and multiple rows are displayed in a display unit;
- a changing step of changing the matrix for arranging the multiple images displayed by the display control step from a first matrix to a second matrix in which the number of columns, rows, or both columns and rows is different from the first matrix;
- a deciding step of deciding a location, on the display unit, at which the second image is to be displayed in the second matrix, the decision being made based on a location, on the display unit, at which the selected image is displayed in the first matrix; and
- a control step of, when a change is performed by the changing step, controlling the display control step to arrange the multiple images in the second matrix so that the selected image is displayed in the second matrix at the location decided by the deciding step.

25. A display control method comprising:
- a display control step of performing control so that multiple images arranged in a two-dimensional layout are displayed in a display unit;
- a changing step of changing the two-dimensional layout for arranging the multiple images displayed by the display control step from a first two-dimensional layout to a second two-dimensional layout in which the number of images is different from the first two-dimensional layout; and
- a control step of, when a change is performed by the changing step, controlling the display control step to arrange the multiple images in the second two-dimensional layout so that the selected image is displayed in the second two-dimensional layout at a display region which at least partly overlaps a display region at which the selected image is displayed in the first two-dimensional layout.

26. A display control method comprising:
- a display control step of performing control so that multiple images arranged in a two-dimensional layout are displayed in a display unit;
- a changing step of changing the two-dimensional layout for arranging the multiple images displayed by the display control step from a first two-dimensional layout to a second two-dimensional layout in which the number of images is different from the first two-dimensional layout;
- a deciding step of deciding a location, on the display unit, at which the second image is to be displayed in the second two-dimensional layout, the decision being made based on a location, on the display unit, at which the selected image is displayed in the first two-dimensional layout; and
- a control step of, when a change is performed by the changing step, controlling the display control step to arrange the multiple images in the second two-dimensional layout so that the selected image is displayed in the second two-dimensional layout at the location decided by the deciding step.

27. A non-transitory computer-readable storage medium embodying a computer program therein that causes a computer to execute a display control method comprising:
- a display control step of performing control so that multiple images arranged in a matrix made up of multiple columns and multiple rows are displayed in a display unit;
- a changing step of changing the matrix for arranging the multiple images displayed by the display control step from a first matrix to a second matrix in which the number of columns, rows, or both columns and rows is different from the first matrix; and
- a control step of, when a change is performed by the changing step, controlling the display control step to arrange the multiple images in the second matrix so that the selected image is displayed in the second matrix at a display region which at least partly overlaps a display region at which the selected image is displayed in the first matrix.

28. A non-transitory computer-readable storage medium embodying a computer program therein that causes a computer to execute a display control method comprising:
- a display control step of performing control so that multiple images arranged in a matrix made up of multiple columns and multiple rows are displayed in a display unit;
- a changing step of changing the matrix for arranging the multiple images displayed by the display control step from a first matrix to a second matrix in which the number of columns, rows, or both columns and rows is different from the first matrix; and
- a control step of, when a change is performed by the changing step, controlling the display control step to arrange the multiple images in the second matrix so that the selected image is displayed in the second matrix at a display region which is located proximate to or at the same position of a display region at which the selected image is displayed in the first matrix.

29. A non-transitory computer-readable storage medium embodying a computer program therein that causes a computer to execute a display control method comprising:
- a display control step of performing control so that multiple images arranged in a matrix made up of multiple columns and multiple rows are displayed in a display unit;
- a changing step of changing the matrix for arranging the multiple images displayed by the display control step from a first matrix to a second matrix in which the number of columns, rows, or both columns and rows is different from the first matrix;
- a deciding step of deciding a location, on the display unit, at which the second image is to be displayed in the second matrix, the decision being made based on a location, on the display unit, at which the selected image is displayed in the first matrix; and
- a control step of, when a change is performed by the changing step, controlling the display control step to arrange the multiple images in the second matrix so that the selected image is displayed in the second matrix at the location decided by the deciding step.

30. A non-transitory computer-readable storage medium embodying a computer program therein that causes a computer to execute a display control method comprising:
- a display control step of performing control so that multiple images arranged in a two-dimensional layout are displayed in a display unit;

a changing step of changing the two-dimensional layout for arranging the multiple images displayed by the display control step from a first two-dimensional layout to a second two-dimensional layout in which the number of images is different from the first two-dimensional layout; and a control step of, when a change is performed by the changing step, controlling the display control step to arrange the multiple images in the second two-dimensional layout so that the selected image is displayed in the second two-dimensional layout at a display region which at least partly overlaps a display region at which the selected image is displayed in the first two-dimensional layout.

31. A non-transitory computer-readable storage medium embodying a computer program therein that causes a computer to execute a display control method comprising:

a display control step of performing control so that multiple images arranged in a two-dimensional layout are displayed in a display unit;

a changing step of changing the two-dimensional layout for arranging the multiple images displayed by the display control step from a first two-dimensional layout to a second two-dimensional layout in which the number of images is different from the first two-dimensional layout;

a deciding step of deciding a location, on the display unit, at which the second image is to be displayed in the second two-dimensional layout, the decision being made based on a location, on the display unit, at which the selected image is displayed in the first two-dimensional layout; and a control step of, when a change is performed by the changing step, controlling the display control step to arrange the multiple images in the second two-dimensional layout so that the selected image is displayed in the second two-dimensional layout at the location decided by the deciding step.

* * * * *